(12) United States Patent    (10) Patent No.:     US 7,837,233 B2
Johnston et al.              (45) Date of Patent:     Nov. 23, 2010

(54) EXHAUST SYSTEM SLIP JOINT

(75) Inventors: Spencer C. Johnston, Wattsburg, PA (US); Glen R. Alden, Columbus, IN (US); William R. Storkman, Columbus, IN (US); James R. Duke, Columbus, IN (US); Benjamin J. Moshier, Lakewood, NY (US); Reid M. Irish, Stockton, NY (US); Devaraj Doraiswamy, Jamestown, NY (US); Michael T. Kosinski, Ashville, NY (US)

(73) Assignee: Cummins Inc., Columbus, IN (US)

( * ) Notice: Subject to any disclaimer, the term of this patent is extended or adjusted under 35 U.S.C. 154(b) by 797 days.

(21) Appl. No.: 11/509,804

(22) Filed: Aug. 25, 2006

(65) Prior Publication Data

US 2008/0012296 A1    Jan. 17, 2008

Related U.S. Application Data

(60) Provisional application No. 60/711,411, filed on Aug. 26, 2005.

(51) Int. Cl.
    *F16L 15/02* (2006.01)
(52) U.S. Cl. ........................................ 285/302; 60/322
(58) Field of Classification Search ................. 285/302, 285/224, 231, 233, 234; 60/322
    See application file for complete search history.

(56) References Cited

U.S. PATENT DOCUMENTS

| 2,671,703 A | 3/1954 | Laraque |
| 4,084,828 A | 4/1978 | Jones |
| 4,240,651 A | 12/1980 | Mariaulle |
| 4,304,426 A | 12/1981 | Francis |
| 4,394,025 A | 7/1983 | Anderson |
| 4,553,775 A * | 11/1985 | Halling ........................ 285/55 |
| 4,644,747 A * | 2/1987 | Petersen ...................... 60/322 |
| 5,297,824 A | 3/1994 | Imhof et al. |
| 5,390,960 A | 2/1995 | Blake |
| 5,784,881 A * | 7/1998 | Otsuka et al. ................. 60/322 |
| 5,951,058 A | 9/1999 | Dickinson et al. |
| 6,032,463 A * | 3/2000 | Bock ............................ 60/323 |
| 6,220,605 B1 | 4/2001 | Becker, Jr. |
| 6,293,098 B1 * | 9/2001 | Coates ........................ 60/322 |
| 6,446,978 B1 | 9/2002 | Halling et al. |
| 6,640,461 B1 | 11/2003 | Berger |
| 6,983,940 B2 | 1/2006 | Halling |

* cited by examiner

*Primary Examiner*—David E Bochna
(74) *Attorney, Agent, or Firm*—Studebaker & Brackett PC; Tim L. Brackett, Jr.; J. Bruce Schelkopf

(57) ABSTRACT

An exhaust system of an internal combustion engine includes a slip joint with a female section having an opening with an inner diameter, a male section having an outer diameter smaller than the inner diameter of the opening of the female section, the male section being at least partially received in the female section, a wear sleeve disposed between the female section and the male section, and at least one seal contacting the wear sleeve and at least one of the female section and the male section, to seal the slip joint.

10 Claims, 24 Drawing Sheets

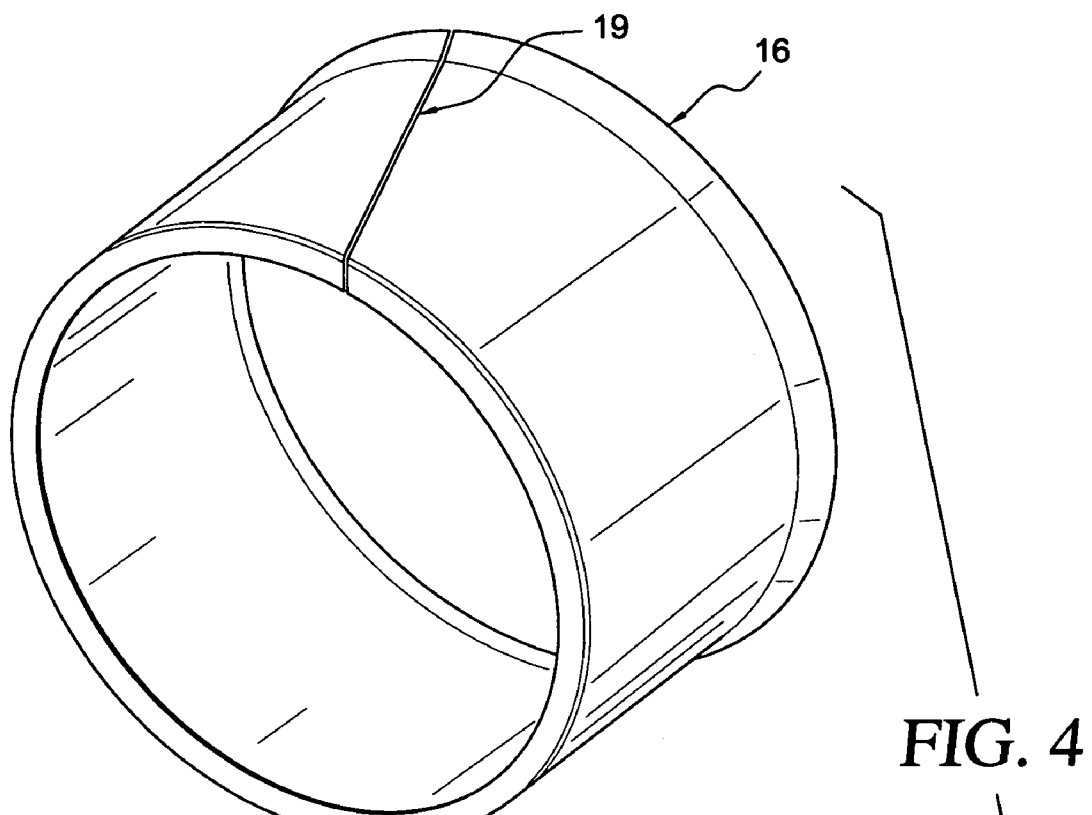
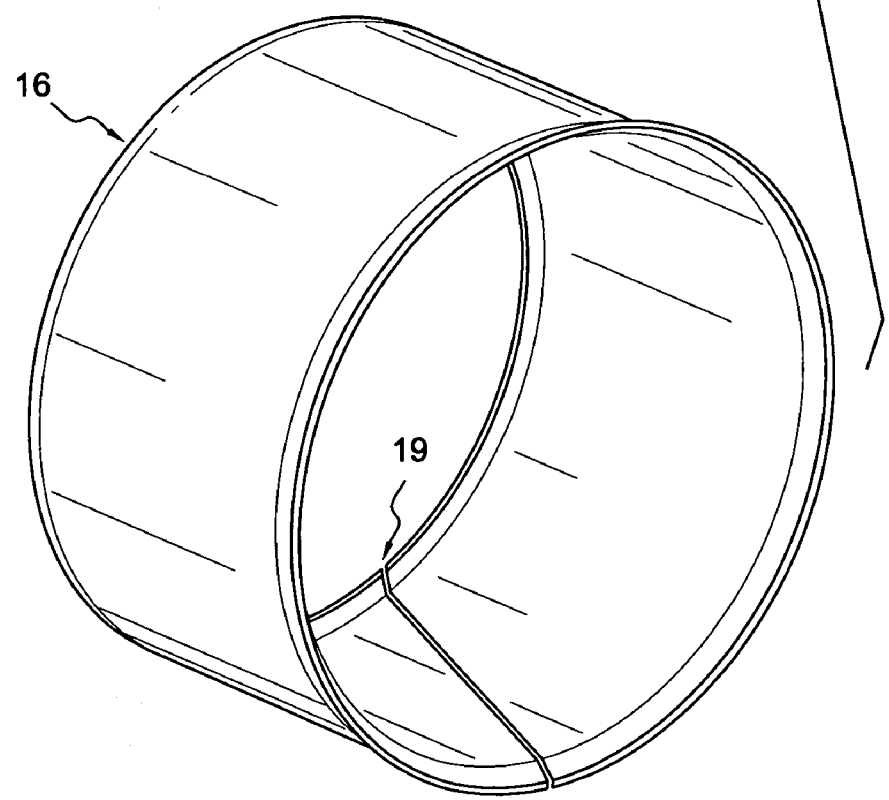
FIG. 4

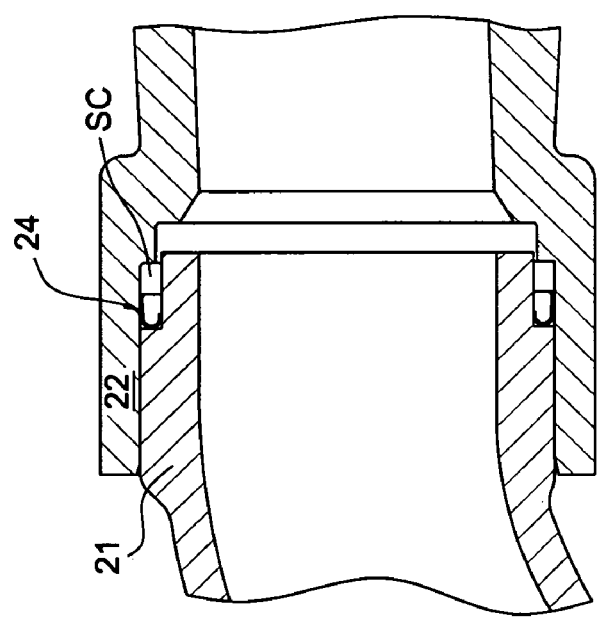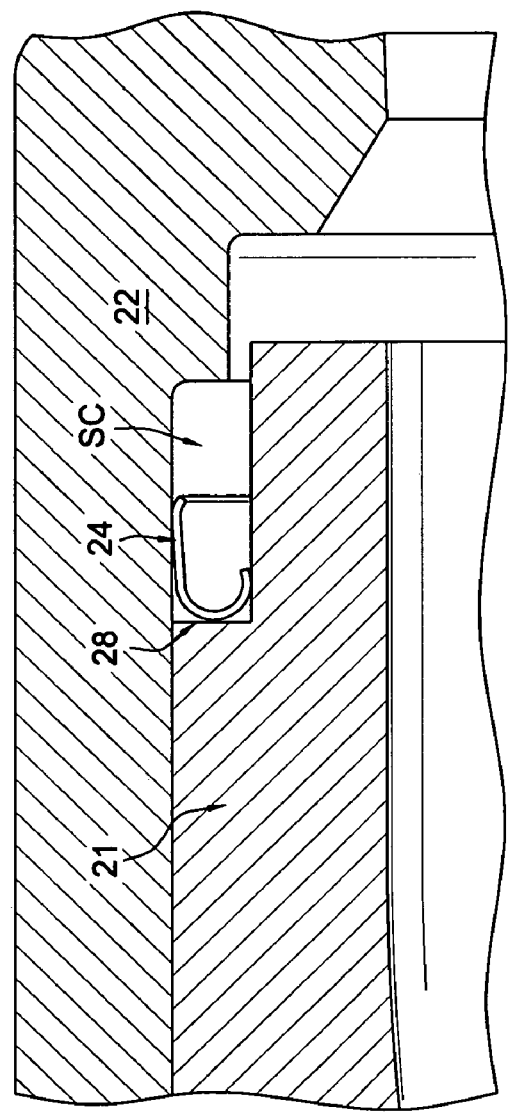

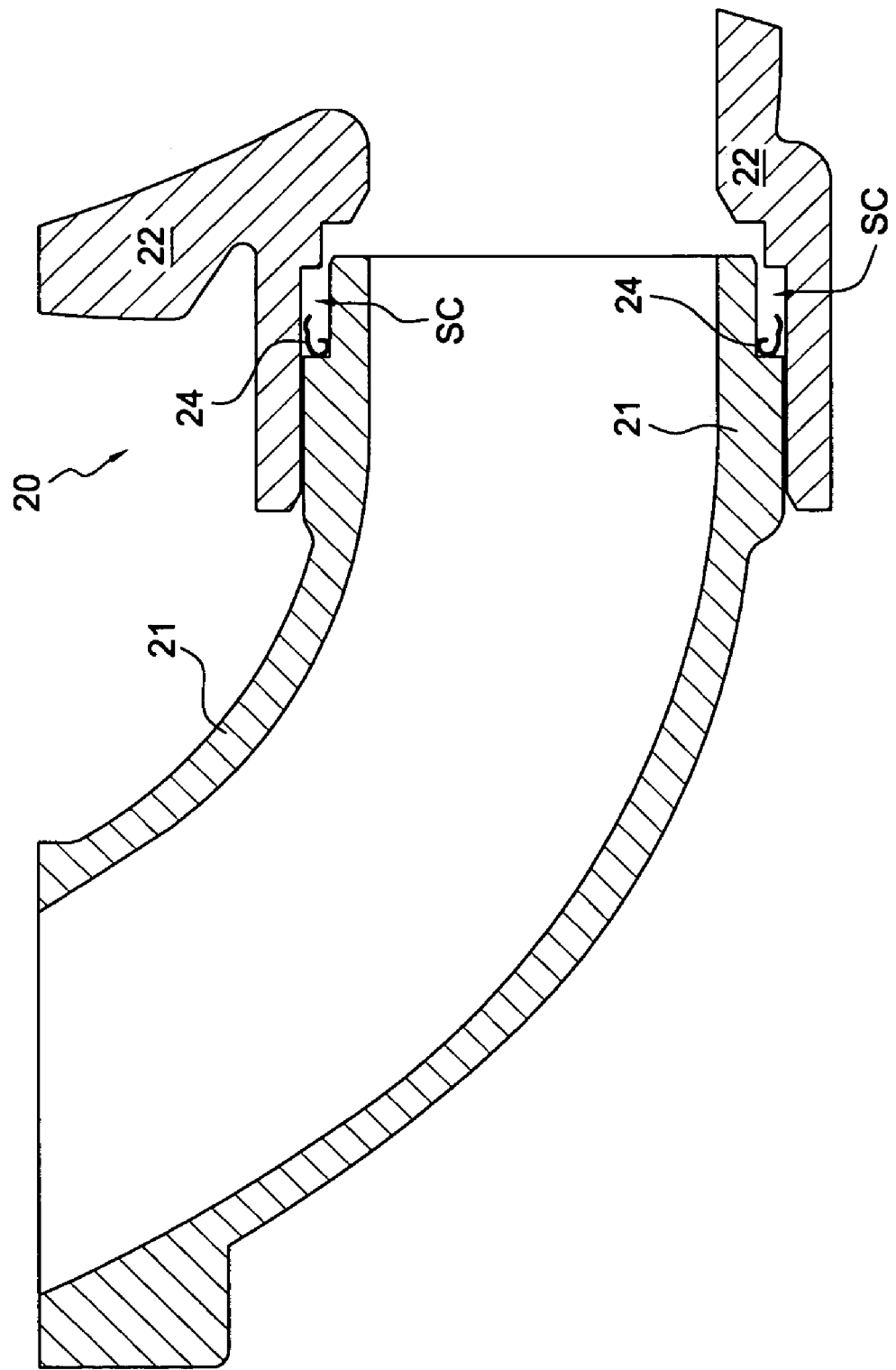

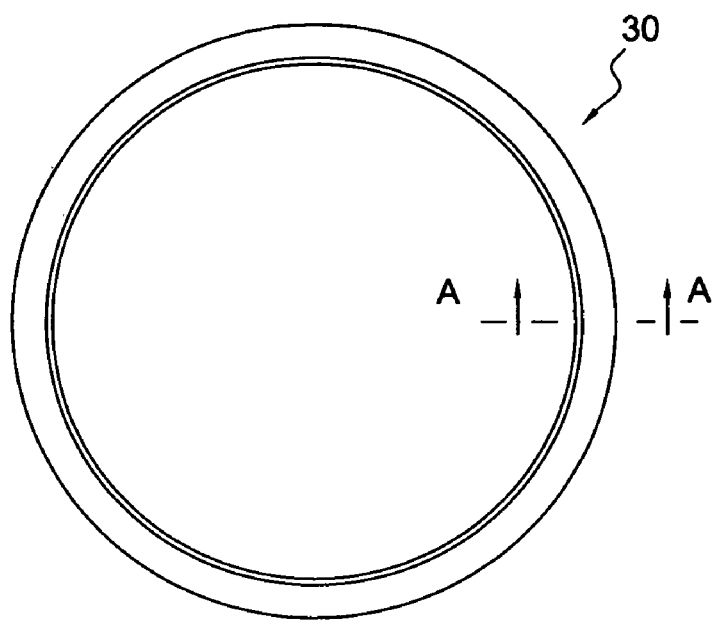
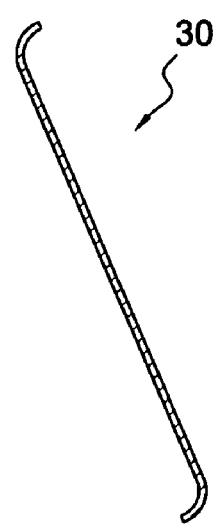
FIG. 11A  FIG. 11B
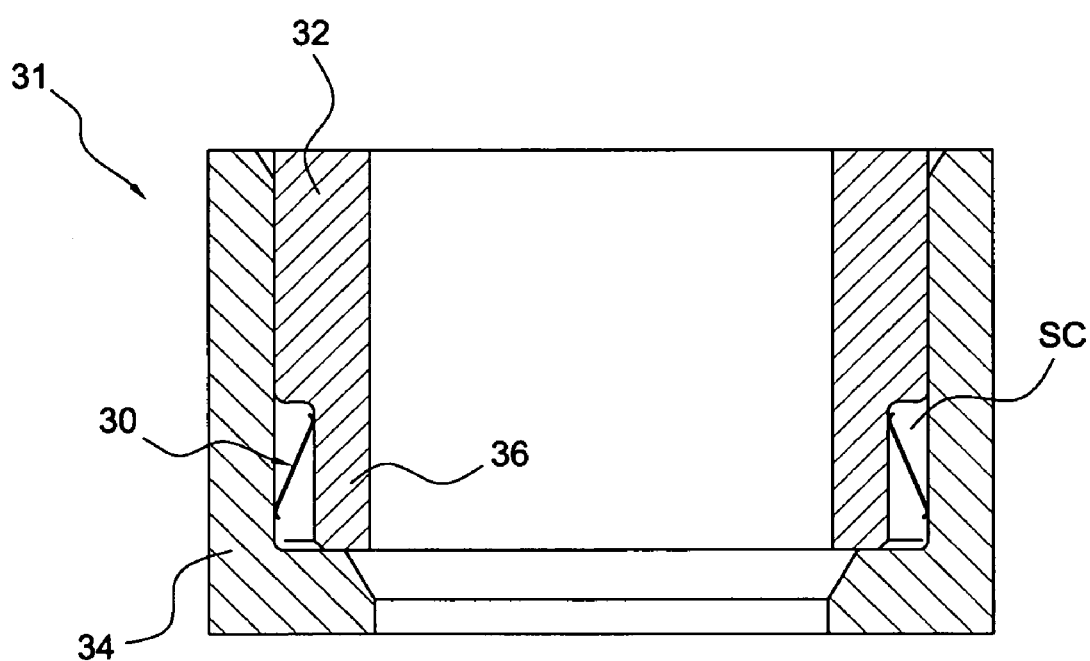
FIG. 12

Table 1

| Coating | Composition | Process | Thickness Microns | Micro Hardness H | Max Temperature F | Estimated Cost | Supplier |
|---|---|---|---|---|---|---|---|
| Armoloy TDC | Cr | Electro Less Plating | 2-5 | RC 70 | 1800 | $0.5-1.0 | Armoloy |
| Tinalox | Ti Al N | Physical Vapor Deposition | 3-6 | 3600 | 1470 | $0.5-3 | Vergason Tech. Inc |
| Alcrona | Al Cr N | Physical Vapor Deposition | 2-4 | 3200 | 2012 | $0.5-3 | Balzers |
| Stellite 21 | Cobalt Based | Electro Spark Deposition | 9-18 | RC 50 | >1400 | $0.5-1.0 | Advanced Surfaces and Process, Inc |
| 7473 Carbide | W Ta Cb | Electro Spark Deposition | 8-15 | 2000 | >>1400 | $0.5-1.0 | Advanced Surfaces and Process, Inc |

FIG. 25

EXHAUST SYSTEM SLIP JOINT

This application claims priority to U.S. Provisional Application No. 60/711,411, filed Aug. 26, 2005, the contents of which are incorporated herein by reference.

BACKGROUND OF THE INVENTION

1. Field of the Invention

The present invention relates to slip joints of an exhaust system and seals used therein.

2. Description of Related Art

U.S. Pat. No. 6,220,605 issued to Becker, Jr. discloses a slip joint for an engine exhaust system having a male and female manifold section which utilizes a sleeve assembly that is disposed about one of the manifold sections. The sleeve assembly has a positioning portion and locating portion. The positioning portion is in sealing engagement with one of the manifold sections and the locating portion is in resiliently sealing engagement with the other manifold section.

U.S. Pat. No. 6,446,978 discloses a resilient seal having an annular curved region with a generally C-shaped cross section, and a pair of annular leg regions. Each leg region has a free end and extends generally radially inward towards the inside of the C-shaped cross section. The leg regions contact each other and each form a generally frustro-conical disk spring member extending inwardly from the curved region. The leg regions are adapted to contact each other and to provide a restoring force when the sealing ring is compressed. A first bend connects one of the leg regions to the curved region, and a second bend connects the other of the leg regions to the curved region.

U.S. Patent Application Publication US 2005/0023769 discloses a resilient, annular, metallic seal member having a generally "j" shaped cross-section. The annular, metallic seal member includes a first end portion having a first distal end, a generally curled second end portion that extends to a second distal end, and a central body portion between and contiguous with the first and second end portions. The annular, metallic seal member has a first side and an opposite second side. The second end portion curls in a first direction in accordance with a predetermined radius such that the second distal end is located across from the first side of the annular, metallic seal member and the first and second distal ends do not face each other.

However, there still exists an unfulfilled need for an improved exhaust system slip joint that provides a more reliable and durable sealing of exhaust systems.

SUMMARY OF THE INVENTION

In view of the foregoing, an advantage of the present invention is in providing an exhaust system with an improved slip joint.

Another advantage of the present invention is in providing such an exhaust system with a slip joint that provides a more reliable and durable sealing of exhaust systems.

In accordance with one embodiment of the present invention, an exhaust system of an internal combustion engine includes a slip joint with a female section having an opening with an inner diameter, a male section having an outer diameter smaller than the inner diameter of the opening of the female section, the male section being at least partially received in the female section, a wear sleeve disposed between the female section and the male section, and at least one seal contacting the wear sleeve and at least one of the female section and the male section, to seal the slip joint. In one implementation of the exhaust system, a diametric clearance between the inner diameter of the female section and the outer diameter of the male section is less than approximately 0.2 mm, and is preferably approximately 0.062 mm.

In another embodiment, the wear sleeve includes a slit extending along an axial length of the wear sleeve, the slit extending at an angle relative to the axial length of the wear sleeve. In another embodiment, the wear sleeve includes a bent flange that abuts against an end of the male section. In accordance with still another embodiment, the wear sleeve is made of a stainless steel or a nickel alloy, and has a cross sectional thickness of approximately 0.005 to 0.05 inch, preferably approximately 0.01 inch.

In accordance with one embodiment of the present invention, the seal has a U-shaped cross section, and the male section includes a groove in which the seal is received. In another embodiment, the male section may include a plurality of grooves, and a plurality of seals are received therein, each seal contacting the wear sleeve to seal the slip joint. In another embodiment, the seal has a substantially J-shaped cross section with a C-shaped portion and a resilient leg portion, the resilient leg portion including a curved portion that abuts against the female section. In such an embodiment, the C-shaped portion may be implemented to be fluidically open to the opening of the female section so that gas pressure in the female section expands the C-shaped portion outwardly. In yet another embodiment, the seal has a substantially truncated S-shape.

The seal of the exhaust system of the present invention may be implemented to include a slit. The seal may be made of a nickel alloy having a material thickness of approximately 0.005 to 0.05 inch, and preferably of approximately 0.01 inch. The male section has a reduced diameter protrusion at least partially defined by a vertical lip, the protrusion and the vertical lip at least partially defining a seal chamber between the male section and the female section, the seal being positioned in the seal chamber. To improve durability, the female section, the male section, the seal and/or the wear sleeve is coated with TiAlN or $Fe_3O_4$ in accordance with another embodiment of the present invention.

In accordance with another embodiment of the present invention, the exhaust system of an internal combustion engine includes a slip joint with a female section having an opening with an inner diameter and a ridge that is smaller than the inner diameter, a male section having an outer diameter smaller than the inner diameter of the opening of the female section, the male section being at least partially received in the female section, and a bellows seal positioned in contact with the ridge of the female section and an end of the male section received in the female section, to seal the slip joint.

In this regard, in accordance with another embodiment, a cross-section of the bellows seal has a substantially wave form shape, and is made of stainless steel or a nickel alloy having a cross sectional material thickness of approximately 0.3 to 0.5 mm. In another embodiment, the female section and/or the male section include a tab on an exterior surface thereof for preloading the bellows seal. In another embodiment, the female section, the male section, and the bellows seal is coated with TiAlN or $Fe_3O_4$.

In accordance with still another embodiment of the present invention, the exhaust system of an internal combustion engine includes a slip joint with a female section having an opening with an inner diameter and an enlarged end flange that extends radially outwardly at the opening of the female section, and a male section having an outer surface with an outer diameter smaller than the inner diameter of the opening of the female section, the male section having an enlarged seat that extends radially outwardly from the outer surface, the enlarged seat having a radial dimension larger than the inner diameter of the opening of the female section, and at least a portion of the male section being received in the female section. The exhaust system also includes at least one washer seal that engages the male section, and is positioned between, and in contact with, the end flange of the female section and the enlarged seat of the male section.

In accordance with one embodiment, the cross-section of the washer seal has a hook-like shape and is made of stainless steel or a nickel alloy having a material thickness of approximately 0.3 to 0.5 mm. In another embodiment, the female section and/or the male section include a tab provided on an exterior surface thereof for preloading the washer seal. In still another embodiment, the female section, the male section, and/or the washer seal is coated with TIAlN or $Fe_3O_4$.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 4 shows perspective views of the wear sleeve shown in FIG. 1A.

FIG. 8A shows a cross-sectional view of the slip joint of FIG. 6 in assembled with the seal ring received between the male and female sections of the slip joint.

FIG. 8B shows an enlarged view of a slip joint area with the seal ring received therein.

FIG. 9 shows a slip joint for an exhaust manifold utilizing a seal ring shown in FIG. 6.

FIG. 11A shows an end view of a seal ring in accordance with yet another embodiment of the present invention.

FIG. 11B shows a partial cross-sectional view of the seal ring of FIG. 11A.

FIG. 12 shows a slip joint utilizing the seal ring shown in FIGS. 11A and 11B received therein.

FIG. 25 shows Table 1 that sets forth various coatings and their characteristics.

DETAILED DESCRIPTION OF THE PREFERRED EMBODIMENT

Figure 1A:
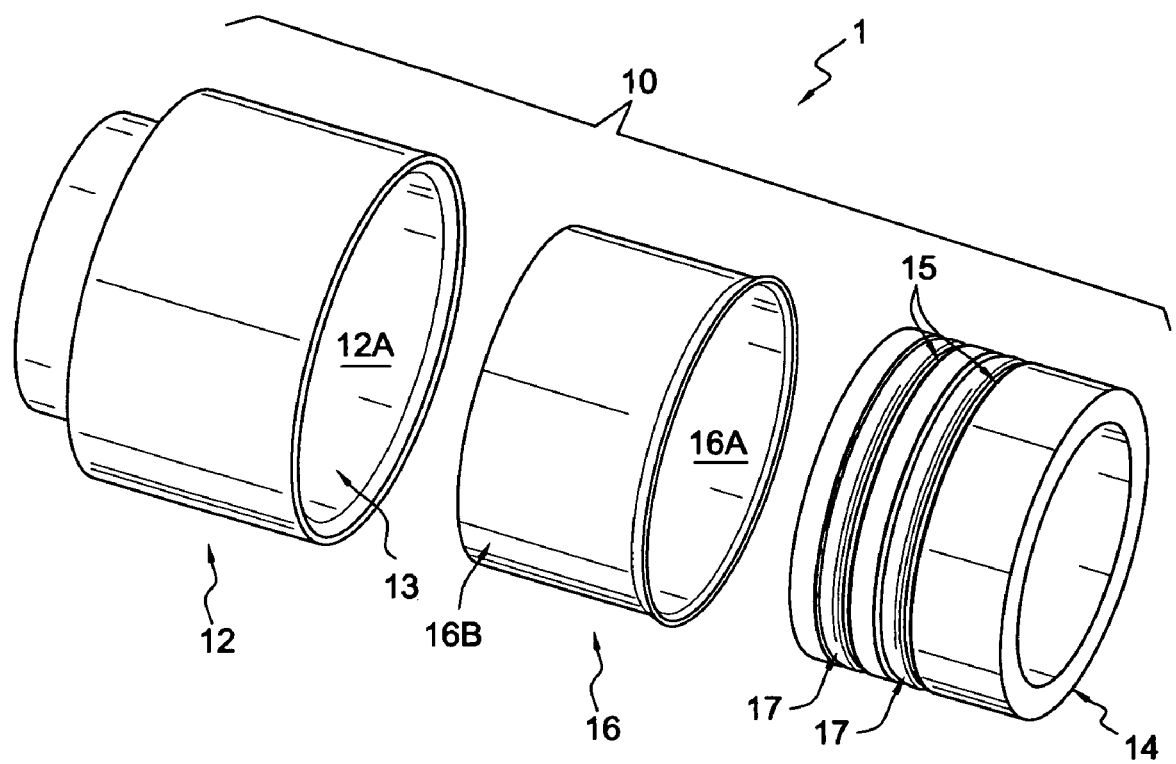
FIG. 1A shows an exploded assembly view of a slip joint in accordance with one example embodiment of the present invention.
Figure 1B:
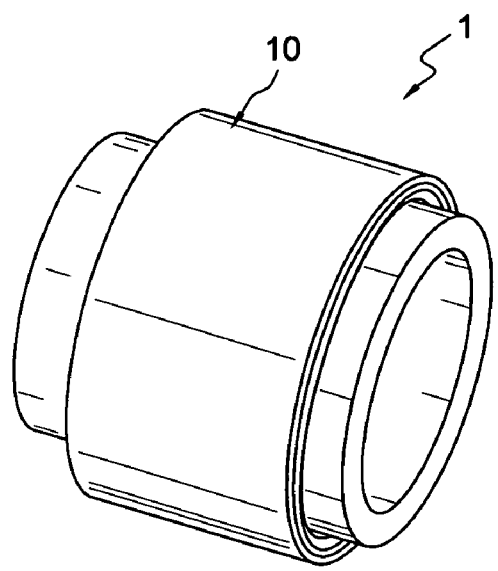
FIG. 1B shows an assembled view of the slip joint of FIG. 1A.

FIG. 1A shows an exploded assembly view of an exhaust system 1 of an internal combustion engine that incorporates a slip joint 10 in accordance with one embodiment of the present invention, such as an exhaust manifold. The illustrated slip joint 10 includes a female section 12 that is substantially tubular in shape with an inner surface 12A that defines an opening 13 which extends therethrough. The inner diameter of the opening 13 of the female section 12 is sized to movably receive the male section 14 therein. Correspondingly, the opening 13 of the female section 12 is sized slightly larger than the outer diameter of the male section 14. Disposed between the female section 12 and the male section 14 is a wear sleeve 16 which is also size to be received within the female section 12, and sized to receive the male section 14 therein. The male section 14 includes annular grooves 15 in the outer surface thereof in which seal rings 17 are received. The male section 14, together with the seal rings 17, are sized to be received in the opening of the wear sleeve 16. FIG. 1B shows the assembled view of the slip joint 10.

Figure 2A:
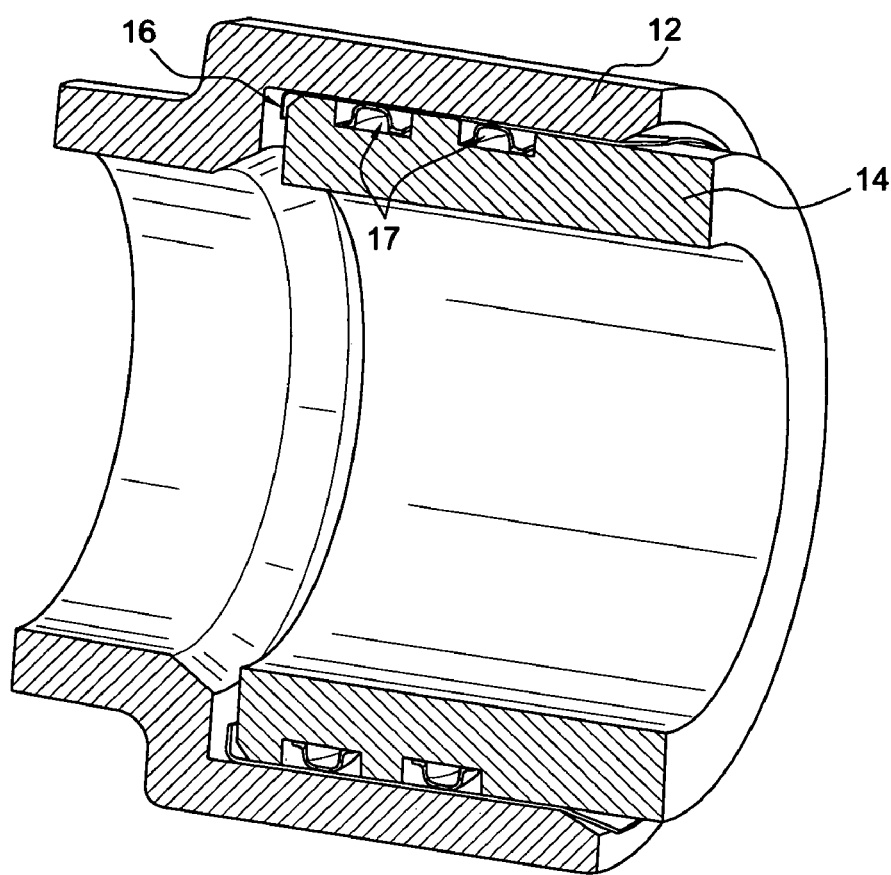
FIG. 2A shows a cross-sectional view of the assembled slip joint of FIG. 1B.
Figure 2B:
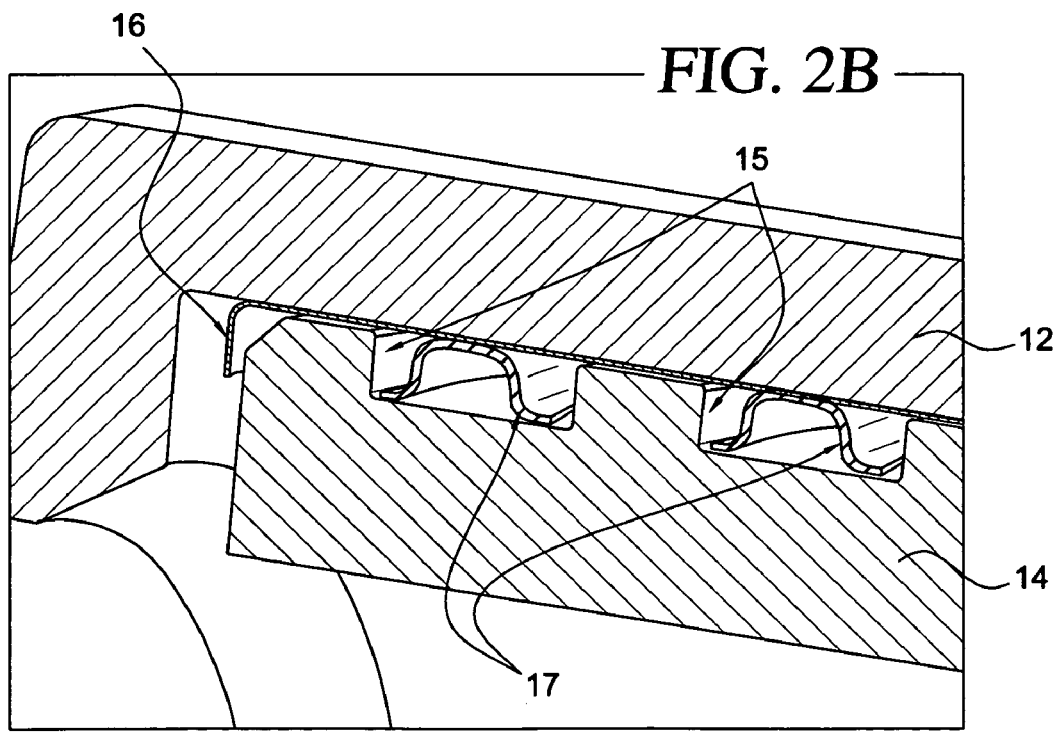
FIG. 2B shows an enlarged sectional view of the slip joint area clearly showing the seal and the wear sleeve.
Figure 3:
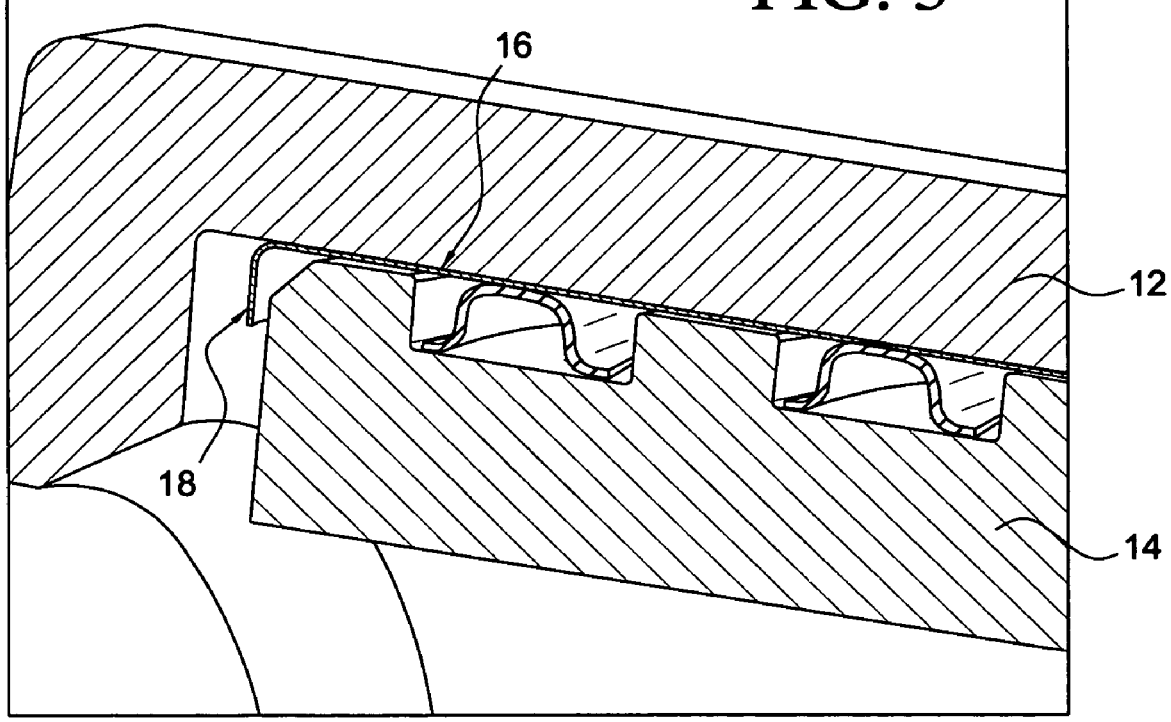
FIG. 3 is a further enlarged cross-sectional view of the slip joint that clearly shows the seal rings and the wear sleeve received in the slip joint.

As most clearly shown in the cross-sectional views of FIGS. 2A to 3, the slip joint 10 in accordance with the illustrated embodiment uses two seal rings 17 which are received in the grooves 15 of the male section 14. The seal rings 17 of the illustrated embodiment have a U-shaped cross section, and may be made of thin wall stamped steel expansion rings. The seal rings 17 function to seal against the wear sleeve 16 that is disposed between the female section 12 and the male section 14 in the manner shown. A pressure force is exerted from these seal rings 17 to the inner wall 16A of the wear sleeve 16 to prevent exhaust gas leakage between the female section 12 and the male section 14. In particular, the resulting force of the seal rings 17 that push outwardly on the surface of the wear sleeves' inner wall 16A creates the seal on the outer surface 16B of the wear sleeve 16 and the female section 12 to seal the slip joint 10. Preferably, there are no sharp contact in any area of the joint to prevent the ability of the slip joint 10 to thermally expand. The present invention reduces the amount of gas leakage area by a factor of approximately 18 over the conventional slip joint designs utilized in conventional exhaust manifolds.

It should be appreciated that the surface contact area of the outer surface 16B of wear sleeve 16 does not wear into the female section 12 of the slip joint 10, thus allowing the exhaust system sections to thermally expand and contract, i.e., move relative to one another. FIG. 3 further shows a feature of the wear sleeve 16 in accordance with the illustrated embodiment. In particular, the sleeve 16 is provided with a bent flange 18 which abuts against the end of the male section 14. The bent flange 18 prevents the wear sleeve 16 from sliding out of the slip joint 10. In addition, as shown in the perspective views of FIG. 4, the wear sleeve 16 is further provided with a slit 19. As can be seen, the slit 19 generally extends along the axial length of the wear sleeve 16. In the illustrated embodiment, the slit 19 also extends at a slight angle relative to the axial length of the wear sleeve 16 as most clearly shown in FIG. 4. The slit 19 compensates for assembly and thermal changes in mating components, the slight angling of the slit 19 enhancing the functionality of the wear sleeve 16.

The wear sleeve 16 may be made of an appropriate material such as stainless steel materials like 316 Stainless, Nitronic 60, etc. The wear sleeve 16 may also be made of a nickel alloy such as Inconel, or Monel. Preferably, the wear sleeve 16 is made of a material that has a cross sectional thickness that is approximately 0.005 to 0.05 inch, and more preferably has a thickness of approximately 0.01 inch. For commercial diesel engine exhaust manifolds, wear sleeves 16 having a length dimension of approximately 42 mm has been found to be effective in allowing for expansion and contraction of the exhaust manifold via the slip joint 10.

Figure 5:
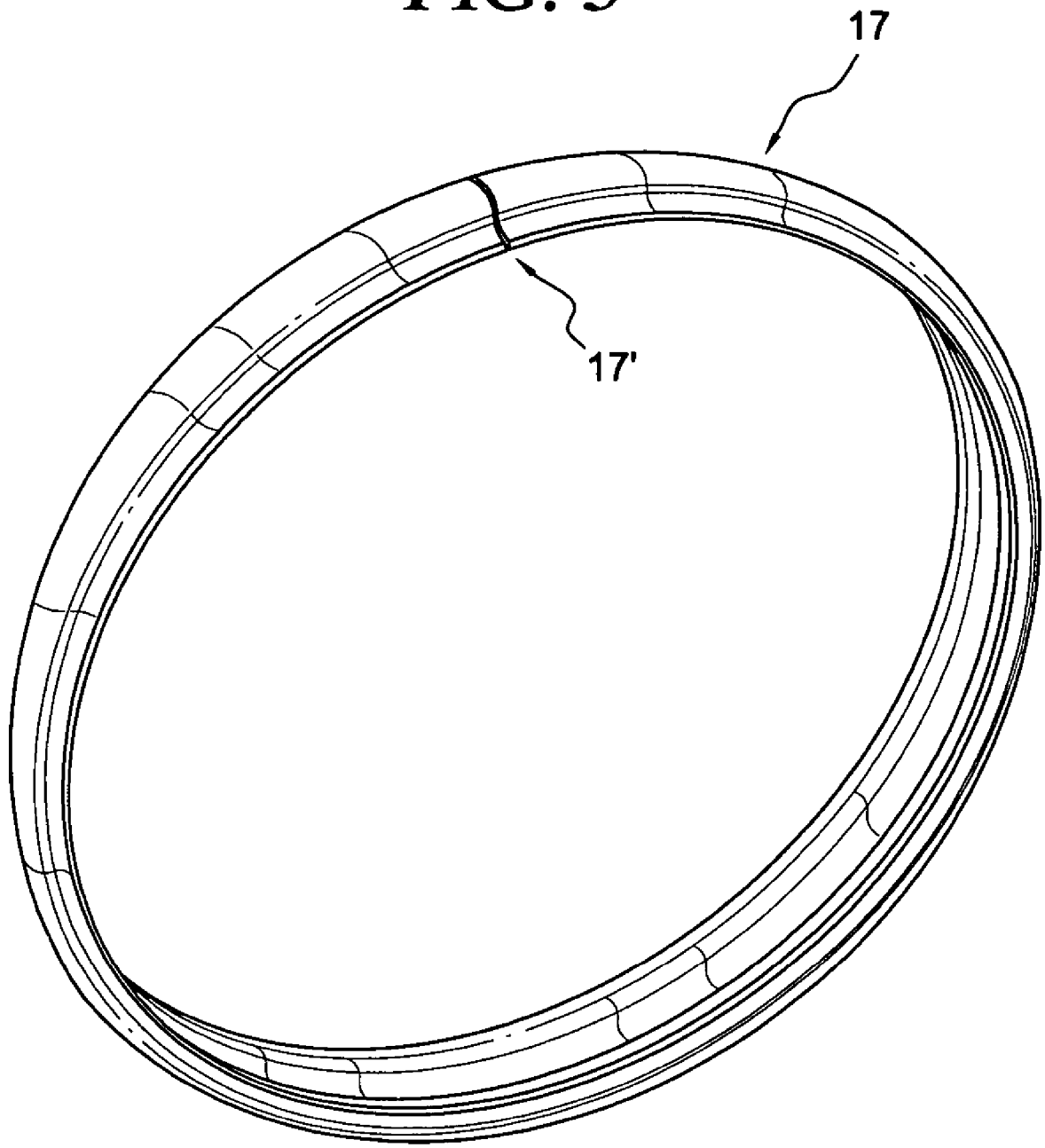
FIG. 5 shows a perspective view of the seal ring of FIG. 1A.

FIG. 5 shows the perspective view of the seal ring 17. As shown, further includes slit 17' to compensate for the assembly and thermal changes in the mating components of the slip joint 10. The seal ring 17 may also be made of an appropriate material such as Inconel or Monel having a thickness of approximately 0.005 to 0.05 inch, and preferably approximately 0.01 inch. Seal rings 17 having a length dimension of approximately 8 mm has been found to be effective for sealing in the slip joint 10 shown.

Figure 6:
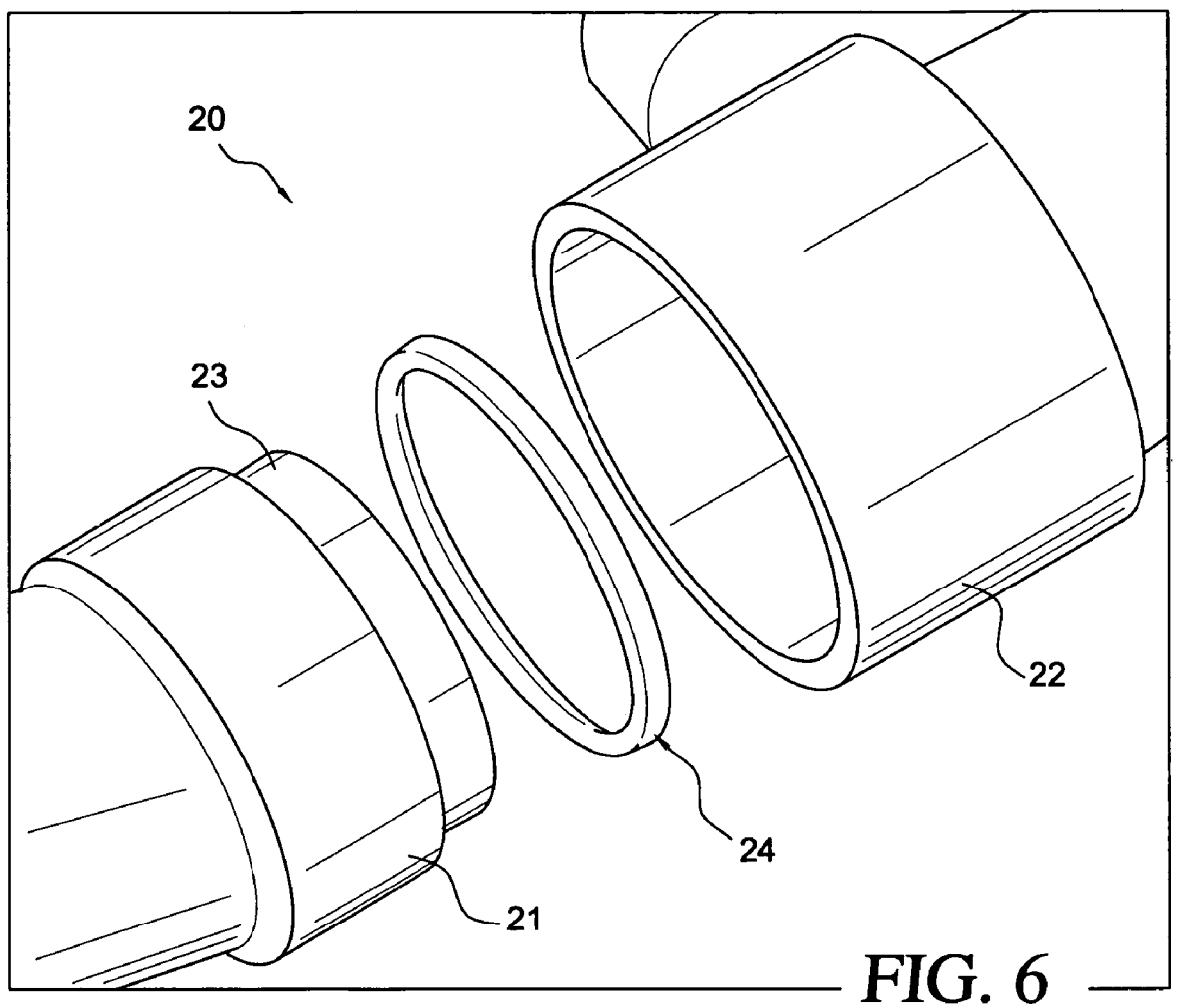
FIG. 6 shows an exploded assembly view of a slip joint in accordance with another embodiment of the present invention.
Figure 7:
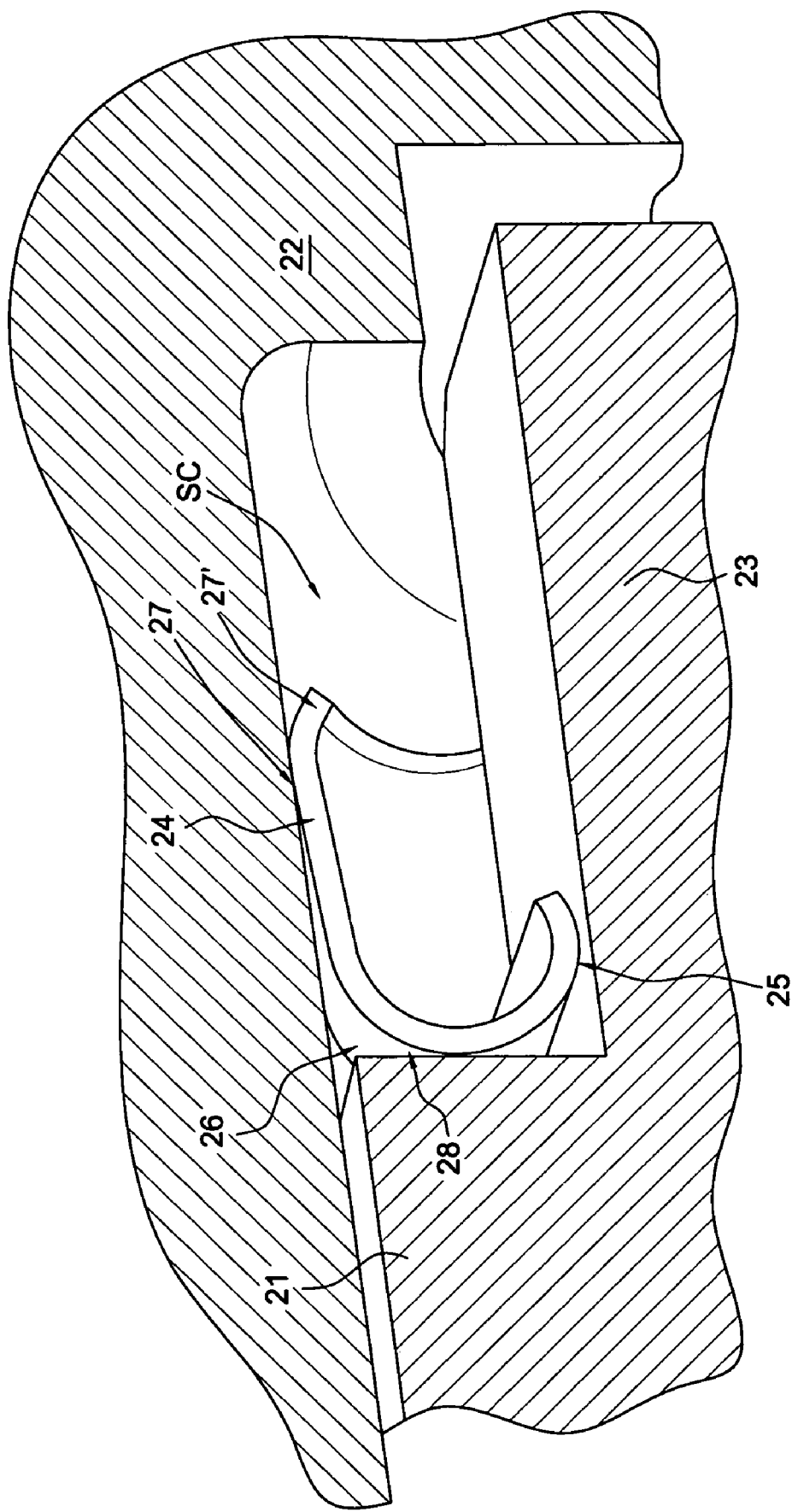
FIG. 7 shows a partial cross-sectional view of the seal ring of FIG. 6.

FIG. 6 shows an exploded assembly view of a slip joint 20 for an exhaust system in accordance with another embodiment of the present invention. The slip joint 20 includes a male section 21, female section 22, and a seal ring 24 received therebetween. As most clearly shown in the cross-sectional views of FIGS. 7 to 8B, the male section 21 has a protrusion 23 that extends in a cantilevered manner at the end of the male section 21, the protrusion 23 having a reduced outer diameter. Thus, a seal chamber "SC" is defined between female section 22, the protrusion 23 and the vertical lip 28 that is formed by, and which partially defines the protrusion 23 of the male section 21. In addition, as also shown in these figures, the seal ring 24 has a substantially J-shaped cross section with a C-shaped portion 25, a frusto conical section 26 and a resilient leg 27. In the configuration of the slip joint 20 shown, the resilient leg 27 abuts against the inner wall of the female section 22. The seal ring 24 abuts the vertical lip 28.

This embodiment of the seal ring 24 may be implemented as a resilient thin wall metallic seal which seals the slip joint area of a multi-piece exhaust manifold, or other exhaust gas connections. The seal ring 24 allows the male section 21 to be moveably received within the female section 22 while maintaining a seal therebetween. Alternatively, in other embodiments, the seal ring 24 may be mounted to the inner cylindrical surface of the female section 22 and slidingly engage the outer cylindrical surface of the protrusion 23 of the male section 21 via the resilient leg 27. This resilient construction allows flex under both axial and radial thermal expansion in vibratory loads to provide a conformable seal that is energized with gas pressure. In other words, the exhaust gas that is pressurized acts to push and expand the C-shaped portion of 25 of the seal ring 24 outwardly in the seal chamber SC so as to slightly widen the dimension of the C-shaped portion, thereby enhancing the seal performance as the pressure of the exhaust gas increases. Thus, the seal ring conforms to the slip joint designed into the gas carrying structures of the exhaust system which are attached to the engine, with minimal need for mechanical stop features. Of course, such stops can be provided in other implementations of the invention.

In addition, to enhance the performance and durability of the slip joint in accordance with the present invention, the sizes of the mating components of the exhaust manifold that are contacted by the seal may be minimized so that any clearance of spacing behind the seal ring is minimized. For example, in the above described figures and as in particular, FIG. 8B, the diametric clearance between the outer diameter of the male section 21 and the inner diameter of the female section 22 may be implemented to be less than approximately 0.2 mm, and preferably, 0.062 mm. Providing of such a small clearance has been found to improve the performance and durability of the slip joint 20 in accordance with the present invention by limiting the displacement of the seal during thermal, and structural, movements of the components of the exhaust manifold. Of course, this geometric feature between the mating components of the exhaust manifold may be implemented in other implementations and embodiments of the present invention as well.

FIG. 9 schematically illustrates the seal ring 24 in use and being received between the male section 21 and the female section 22 of the slip joint 20. The seal ring 24 is configured to minimize the sealing contact stress in the sliding interface of the slip joint 20 at a level to maintain effective sealing while minimizing the rate of wear. A maximum exhaust leakage limit of approximately 0.1 liters per minute at 2.5 psi has been attained using the slip joint 20 with the seal ring 24 of the illustrated implementation.

Referring to FIGS. 6 to 10, in order to maintain effective sealing while also minimizing the rate of wear, the slidably engaging resilient leg 27 of the seal ring 24 is implemented with a small curved portion 27' that acts to make the free end less prone to deformation. The curved portion 27' thus allows the seal ring 24 to maintain its round shape while enhancing stability and engagement with the cylindrical surface of the female section 22, and avoiding increases in the installation and sliding forces. A C-shaped portion 25 is provided at the diametrically smaller end of the frusto-conical section 26 increases the second moment of area at the end of the seal, and the seal's resistance to being deflected inwardly. When the seal ring is installed over the internal cylindrical surface of the sealing cavity, the seal ring is secure due to the relatively high stiffness, so as to resist axial forces from the slidable end of the seal ring 24, and provide a leak resistant seal interface. Thus, the illustrated embodiment uses the sealing surfaces to locate the seal in the joint, eliminating the need for special locating features.

With respect to wear resistance, the seal ring 24 offers compliance in the slip joint and tends to reduce wear by requiring minimal contact stress against the sliding surfaces of the slip joint. Thus, the present invention can be used with no requirements for special tribological or lubricious coatings in other embodiments. Of course, in other embodiments, such coatings may be utilized in conjunction with the seal ring 24.

However, the illustrated slip joint 20 allows for compliance and effective sealing in aggressive environments. These applications may be implemented with lubricious coatings, tribological coatings and assemblies that utilize wear sleeves of similar range as coatings for a mating surface. The wear sleeves can be implemented as simple structures that provide a surface having a better wear resistance which couples with the seal ring 24. In addition, as noted, the diametric clearance between the male section 22 and the female section 21 may be implemented to be less than approximately 0.2 mm, and preferably, less than approximately 0.062 mm.

Figure 10:
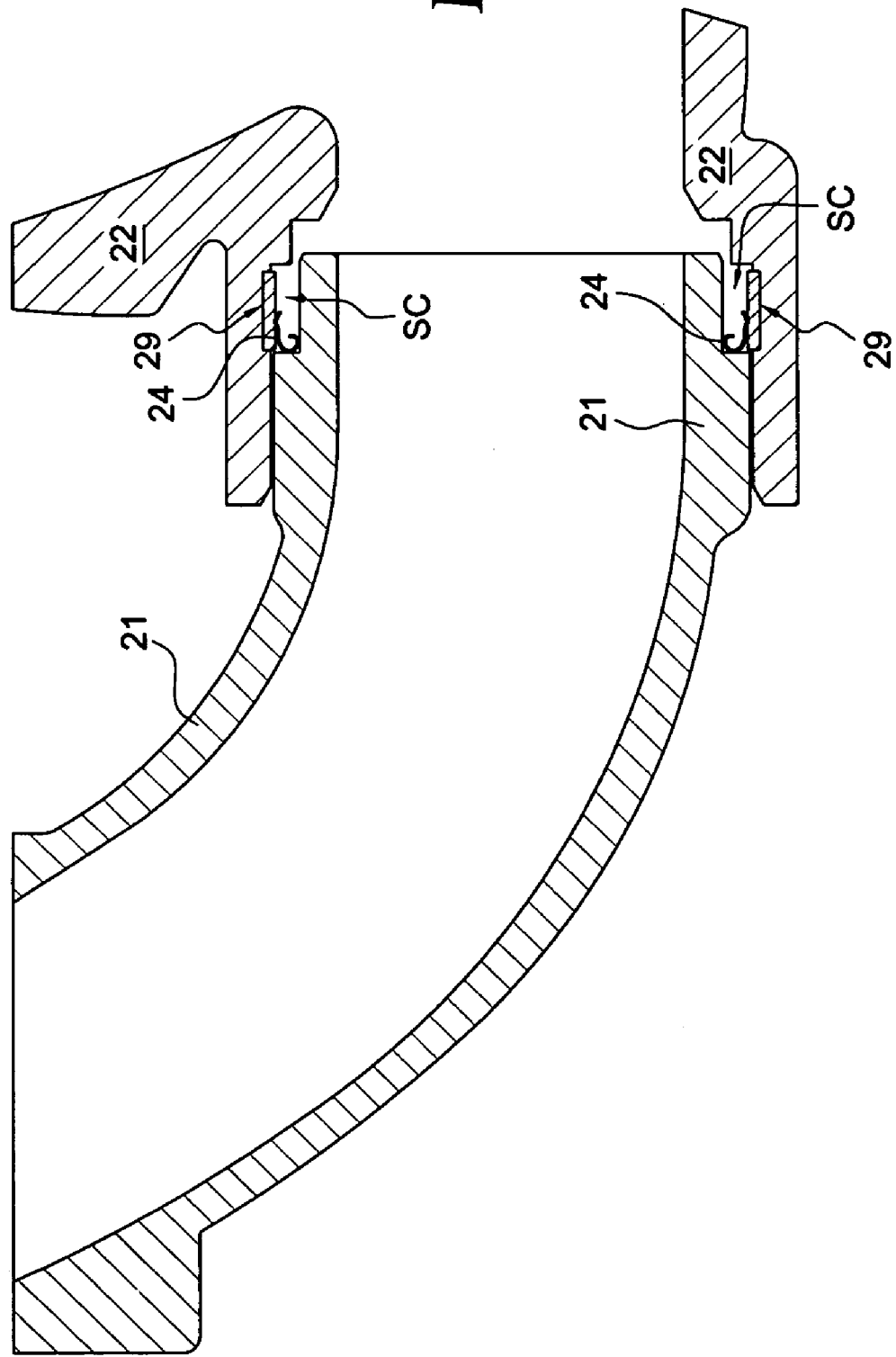
FIG. 10 shows the slip joint further incorporating a wear sleeve in therein.

Alternatively, the sleeves may be more complex to enhance the compliance of the sealing slip joint by allowing deflection in both the seal and the sleeve. Such use of a wear sleeve is shown in the embodiment of FIG. 10 in which a wear sleeve 29 is pressed in a center section bore upon which the seal ring 24 contacts so as to minimize wear on the female section 21. Thus, the embodiments of the seal ring discussed above provides sealing forces that are increased with higher exhaust pressures. In addition, the long J-shaped leg 27 allows the seal ring 24 to be resilient, and take up misalignment between the mating exhaust components such as between the male and female sections. Furthermore, the C-shaped portion 25 of the seal ring 24 clings on the mounting surface, thus causing the sliding motion to occur at the opposite side of the seal ring 24.

FIG. 11A shows an end view of a seal ring 30 in accordance with another embodiment of the present invention. The features of the seal ring 30 are most clearly shown in the partial cross-sectional view of FIG. 11B. As can be seen, the cross section of the seal ring 30 has a truncated S-shape. FIG. 12 shows the seal ring 30 in use. In this regard, a male section 32 is received in a female section 34 of an exhaust manifold. The male section 32 is provided with an annular protrusion 36 that has a smaller outer diameter than the remaining portion of the male section 32. This provides a seal chamber SC in which the seal 30 is received when the male section 32 and the female section 34 are assembled together to provide a slip joint 31. The seal ring 30 seals between the male section 32 and the female section 34 so that exhaust gas does not pass therethrough. In such a manner, slip joint 31 allows relative movement between the male section 32 and the female section 34, while maintaining a proper seal therebetween.

Figure 13:
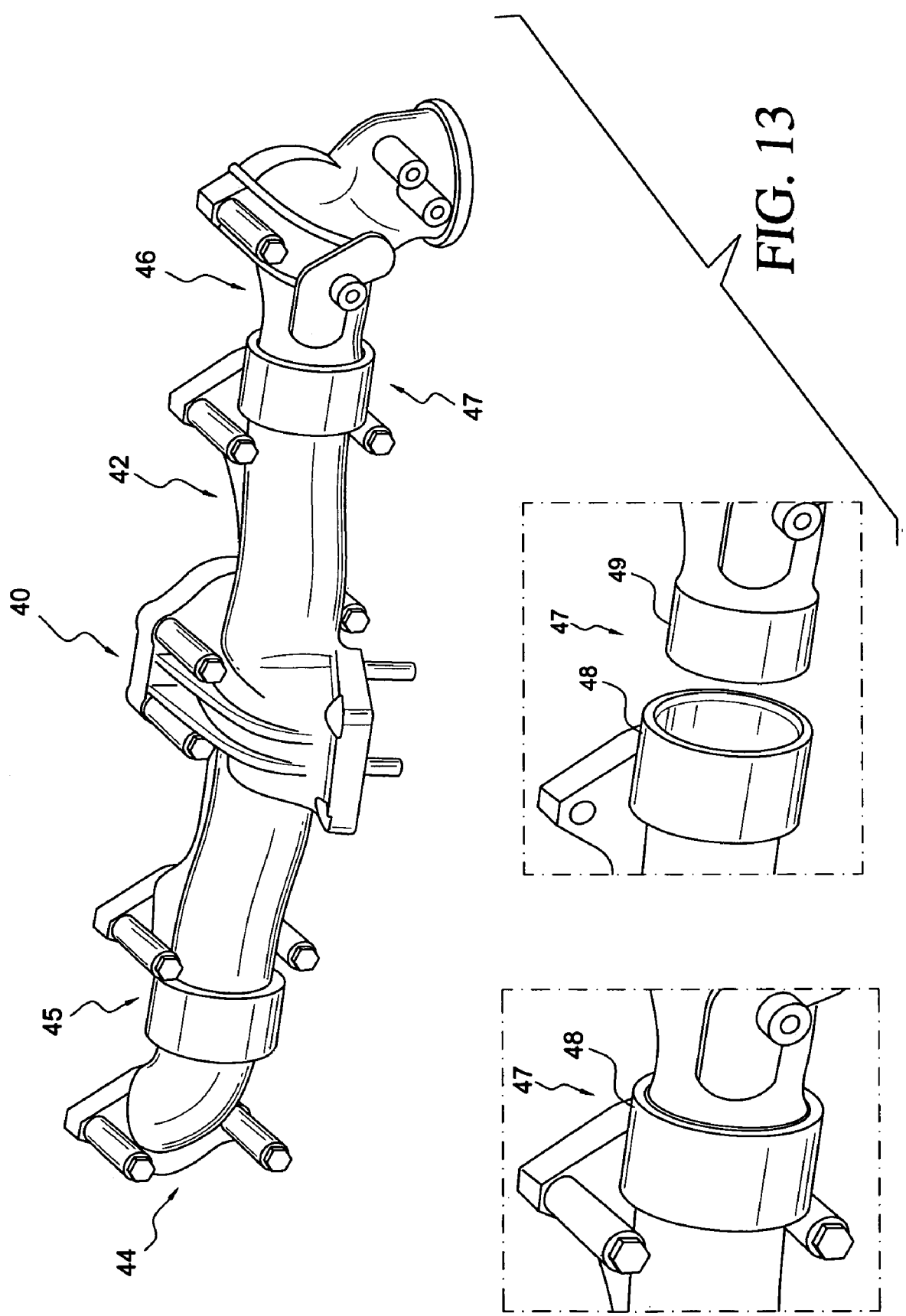
FIG. 13 shows a perspective view of a multi-piece exhaust manifold having slip joints that allow the center section to interface with the end sections.

FIG. 13 shows an exhaust manifold 40 that is made of a plurality of sections in accordance with still another embodiment of the present invention which utilize bellows as described in further detail below. The exhaust manifold 40 includes a center section 42 and two end sections 44 and 46. As can be seen, the end sections 44 and 46 have been assembled with the center section 42. FIG. 13 also illustrates an enlarged view of the assembled, as well as the unassembled, slip joint 47 between the center section 42 and the end section 46. As shown, slip joint 47 includes a female section 48 and a male section 49 that is sized to be received within the female section 48. The end section 44 is assembled with the center section 42 in substantially the same manner at slip joint 45. The illustrated components of the exhaust manifold 40 may be made of a hi-molybdenum silicon ductile iron which has been found to be suitable for diesel engine applications where the inner gas temperature can reach 1375° F. with pressure of 100 PSI, and temperature of the manifold 40 can reach 1200° F. Such an implementation of the exhaust manifold 40 has been found to have a life of over one million miles in diesel engine implementations which is desirable for durability.

Figure 14:
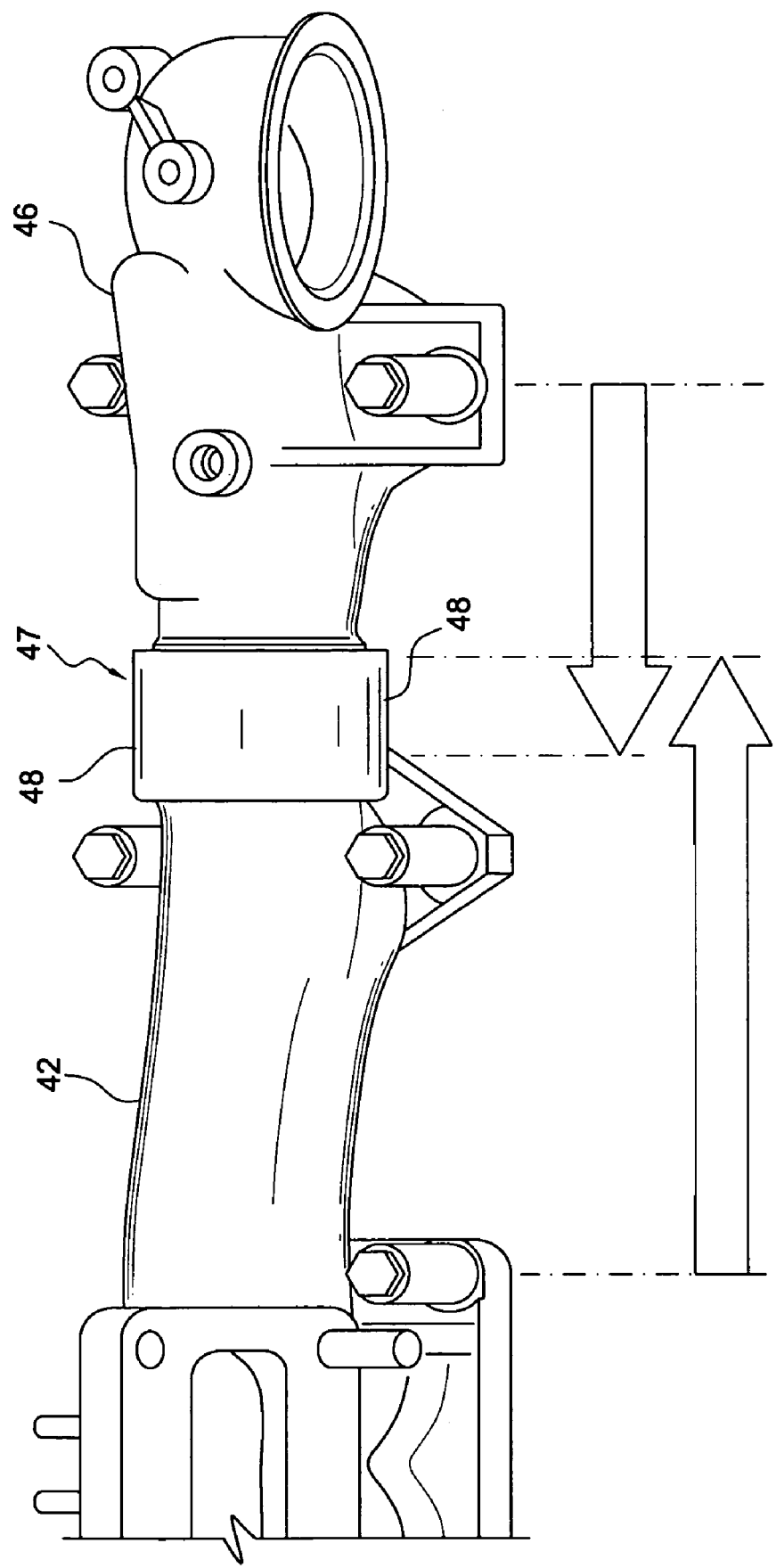
FIG. 14 shows an enlarged perspective view of a slip joint shown in FIG. 13, and the thermal expansion that can occur in the exhaust manifold.
Figure 15:
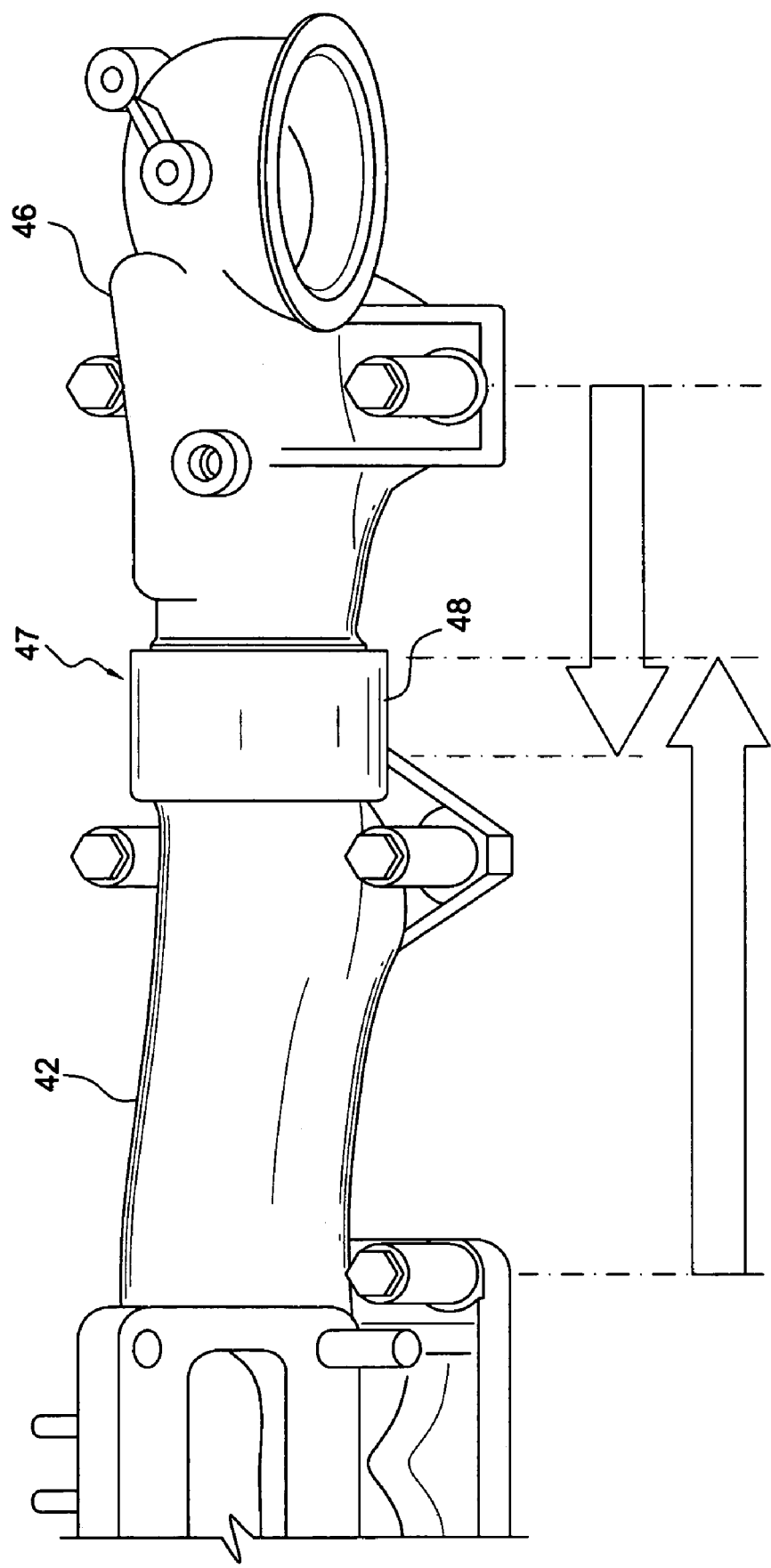
FIG. 15 shows an enlarged perspective view of the exhaust manifold of FIG. 13, and the assembly variation that can occur between the center section and the end section.

FIG. 14 illustrates that the slip joint 47 allows for relative movement between the end section 46 and the center section 42, such relative movement being caused by thermal expansion and contraction as a result of the heat generated by the exhaust gas passing through the exhaust manifold 40. In the implementation described, the center section 42 an thermally expand up to 1.686 mm toward the end section 46, while the end section 46 can expand up to 1.025 mm toward the center section 42. Thus, the slip joint 47 is implemented to allow 2.711 mm of movement between the center section 42 and the end section 46. FIG. 15 further shows the assembly variation in the slip joint 47 between the center section 42 and the end section 46, which can bring these components together or apart by 4.2 mm.

Figure 16:
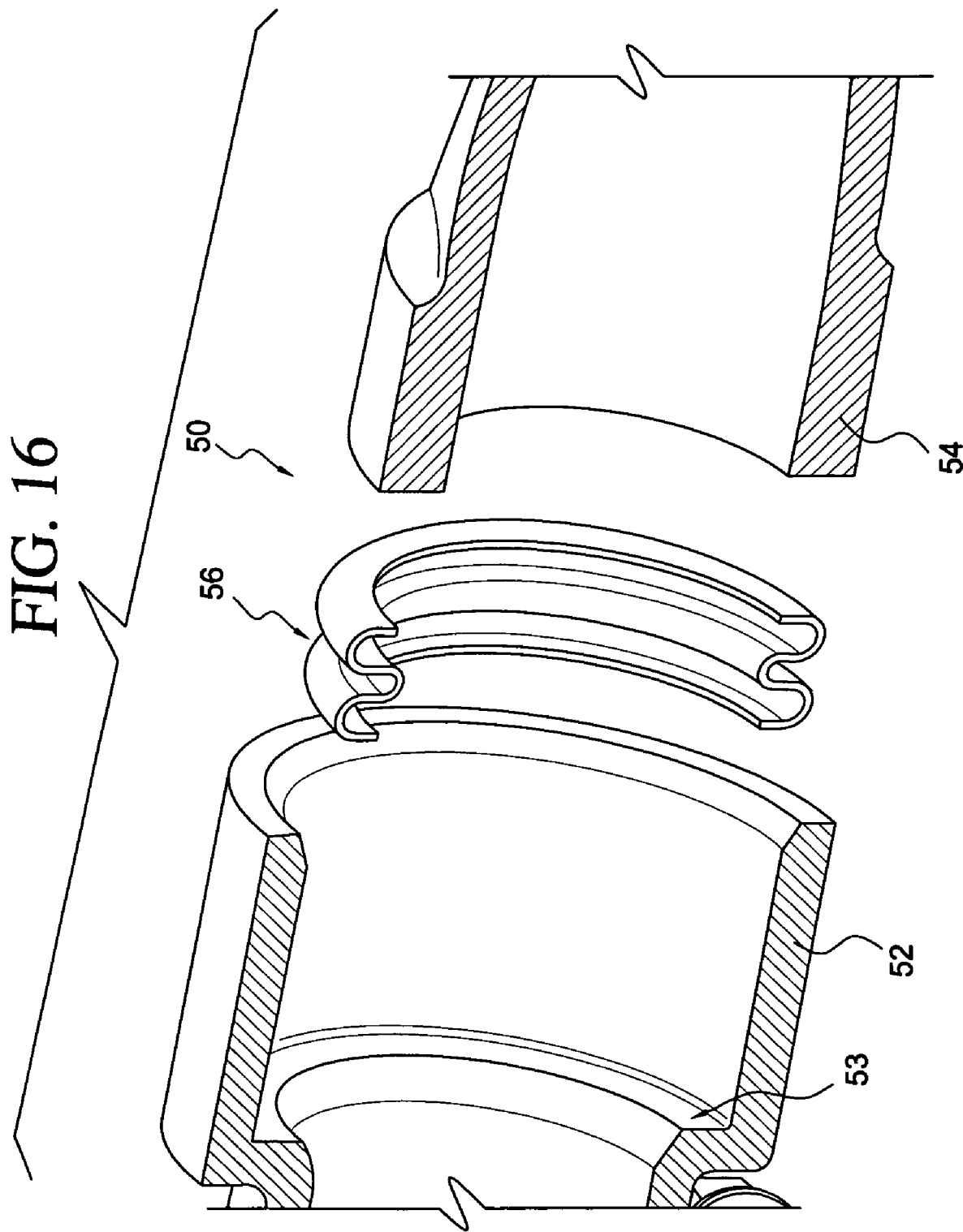
FIG. 16 shows an exploded cross-sectional view of a bellows seal that is received in a slip joint in accordance with another embodiment of the present invention.

In view of the relatively large displacement between the center section and the end section of an exhaust manifold such as that described above, the slip joint that connects the various components must be implemented to accommodate, such displacement, while at the same time, maintain sealing between these components. FIG. 16 shows a cross-sectional view of slip joint 50 that is similar to the slip joint 47 discussed above relative to FIG. 13 to 15. In this regard, the slip joint 50 includes a female section 52 which includes an opening sized to receive a male section 54 therein. Thus, the inner diameter of the opening of the female section 52 is larger than the outer diameter of the male section 54. To improve the sealing of the slip joint 50 between the female section 52 and the male section 54, the embodiment of FIG. 16 incorporates a bellows seal 56.

Figure 17:
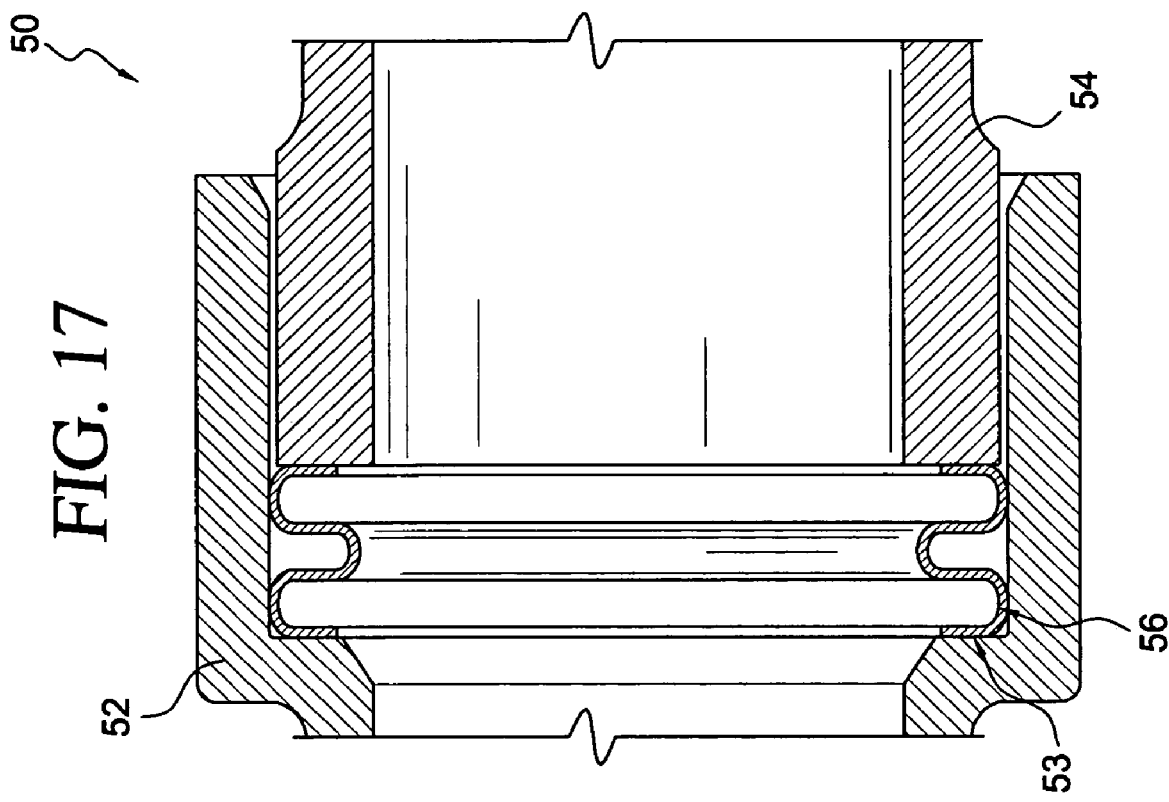
FIG. 17 shows an assembled cross-sectional view of the slip joint of FIG. 16.

FIG. 17 shows a cross-sectional assembled view of the slip joint 50 of FIG. 16. As can be seen, a male section 54 is received in the female section 52. In addition, the bellows seal 56 abuts against the ridge 53 of the female section 52, and against the end of the male section 54, so as to provide a sealed interface in the slip joint 50. As can also be seen, the cross-section of the bellows seal 56 has a substantially wave form shape. Correspondingly, the bellows seal 56 can axially expand or contract in response to the relative movement between the male section 54 and the female section.

Due to the size of the bellows seal 56, the male section 54 may be implemented by removing material from the end of a conventionally dimensioned male section to accommodate the bellows seal 56 in the slip joint 50. When the slip joint 50 is assembled, the female section 52 and the male section 54 apply compressive force on the bellows seal 56 to thereby preload the seal and provide a seal between the end of the male section 54 and the ridge 53 of the female section 52. As noted, the bellows seal 56 deforms in order to allow the manifold to thermally expand. Preferably, the bellows seal 56 is implemented so that within the operating range of displacement, a substantially constant force is exhibited by the bellows seal 56 on the mated female section 52 and the male section 54.

Figure 18:
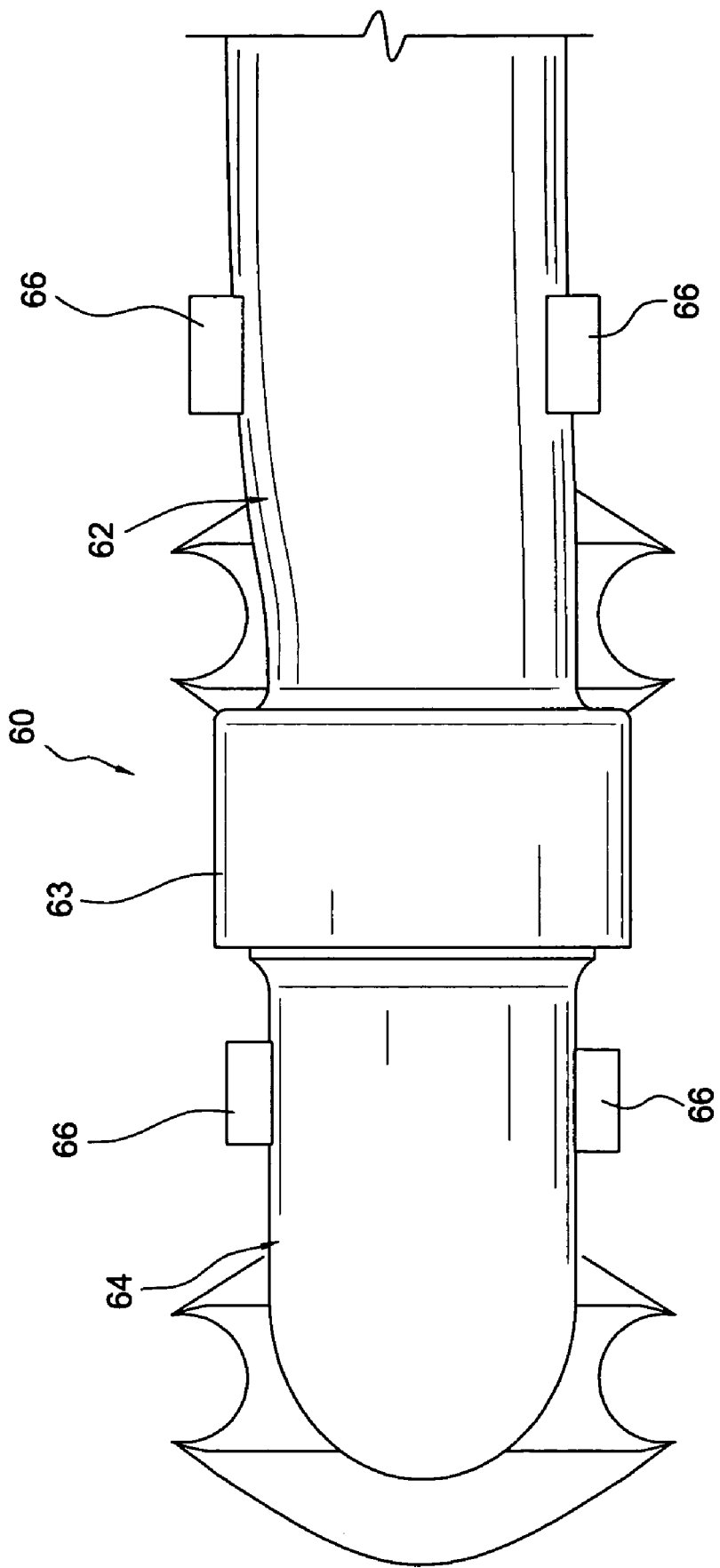
FIG. 18 shows the assembled slip joint having a bellows seal therein, and tabs that can be used to preload the slip joint.

FIG. 18 shows a completely assembled view of the slip joint 60 in which a center section 62 with a female section 63 is assembled together with an end section 64 with the male section (not shown). The slip joint 60 is implemented to include a bellows seal (not shown) in the manner discussed above relative to FIGS. 16 and 17. Furthermore, tabs 66 are provided on exterior of the center section 62 and the end section 64 that can be used during assembly to create the desired preload on the slip joint 60.

Figure 19:
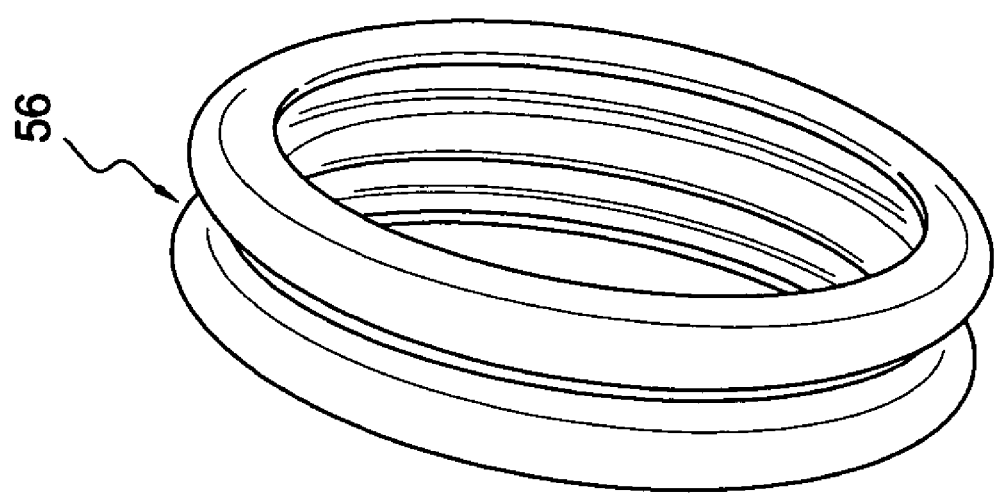
FIG. 19 shows a perspective view of the bellows seal as shown in FIG. 17.

FIG. 19 shows a perspective view of the bellows seal 56 illustrated and discussed above relative to FIGS. 16 to 18 which further illustrate the wave form shape of the bellows seal 56. The bellows seal 56 may be made of a stainless steel, but is preferably made of a nickel alloy. In this regard, the bellows seal 56 may be made of Inconel or Monel, and further have a cross sectional material thickness of 0.3-0.5 mm. In the illustrated implementation, the bellows seal 56 also has a large diameter of approximately 67 mm, a small diameter of approximately 52 mm, and an axial length of approximately 15 mm, the described sizing of the bellows seal 56 having been found to provide appropriate sealing of the described slip joint of FIGS. 16 to 18.

As described above, the use of bellows seals prevent leakage of gas through the slip joint. A pressure force is exerted on the bellows seal by both end section and the center section of the exhaust manifold during assembly, the preload creating the initial seal. During engine operation, the bellows seal can axially deform, i.e. expand or compress, to allow the manifold pieces to thermally expand and/or contract, while maintaining a pressure force necessary to maintain the proper sealing. Therefore, the bellows seals described above provide robust internal sealing where coaxial alignment is not critical. In addition, precision slip joint clearances are unnecessary, and the bellows seal can further be used in conjunction with existing exhaust manifolds upon slight modification of the exhaust components.

Figure 20:
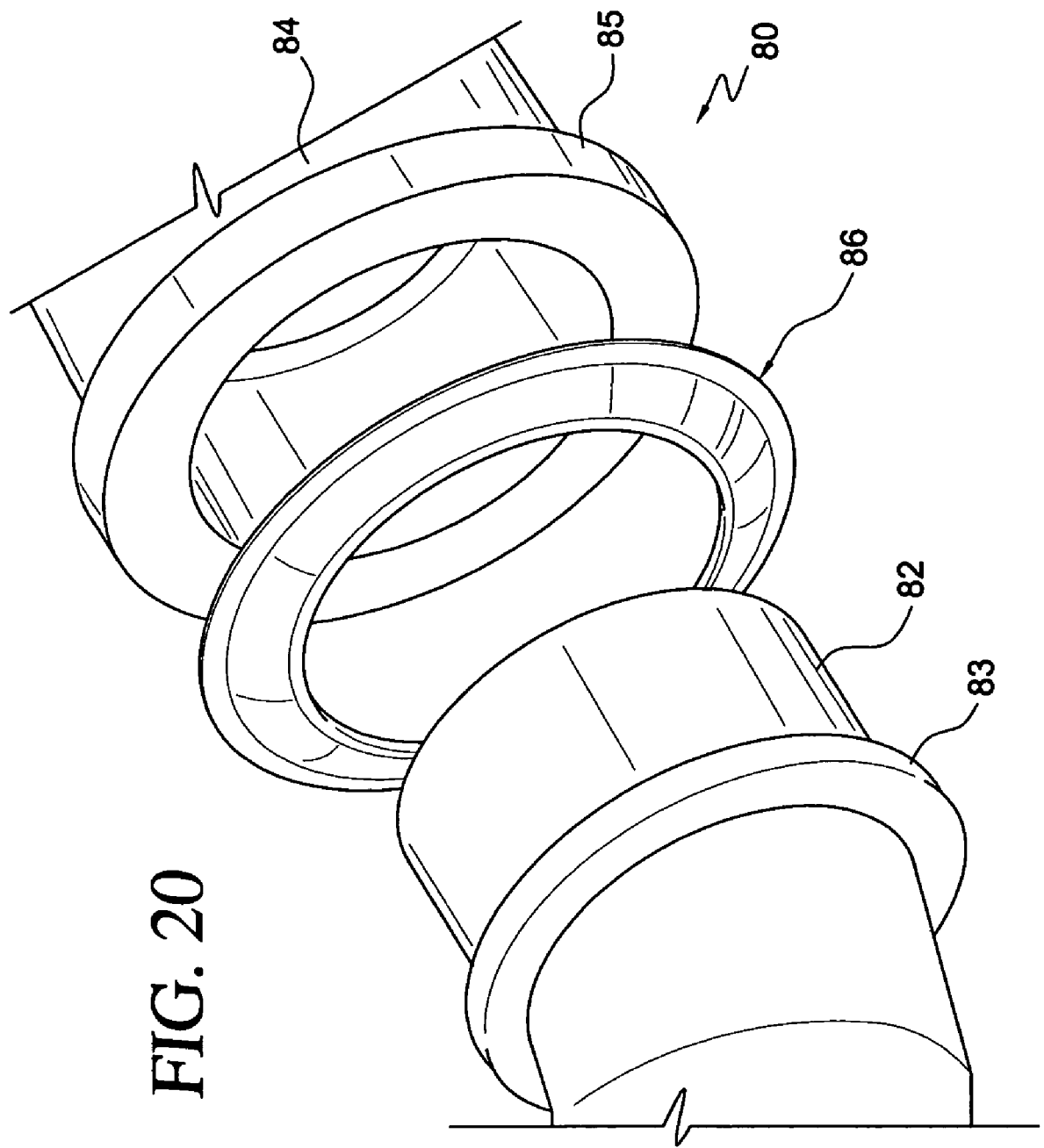
FIG. 20 shows an exploded assembly view of a slip joint having a washer seal in accordance with another embodiment of the present invention.

FIG. 20 shows an exploded assembly view of a slip joint 80 in accordance with another embodiment of the present invention. As can be seen, the slip joint includes a male section 82 and a female section 84 with an opening having an inner diameter that is larger than the outer diameter of the male section 82 so that a portion of the male section 82 is received in the female section 84 as most clearly shown in the cross sectional view of FIG. 22. As can also be seen, the male section 82 includes an enlarged seat 83 that extends radially outwardly from its outer surface, the enlarged seat 83 having a radial dimension larger than the inner diameter of the opening of the female section 84 so that it cannot be received therein.

Figure 21:
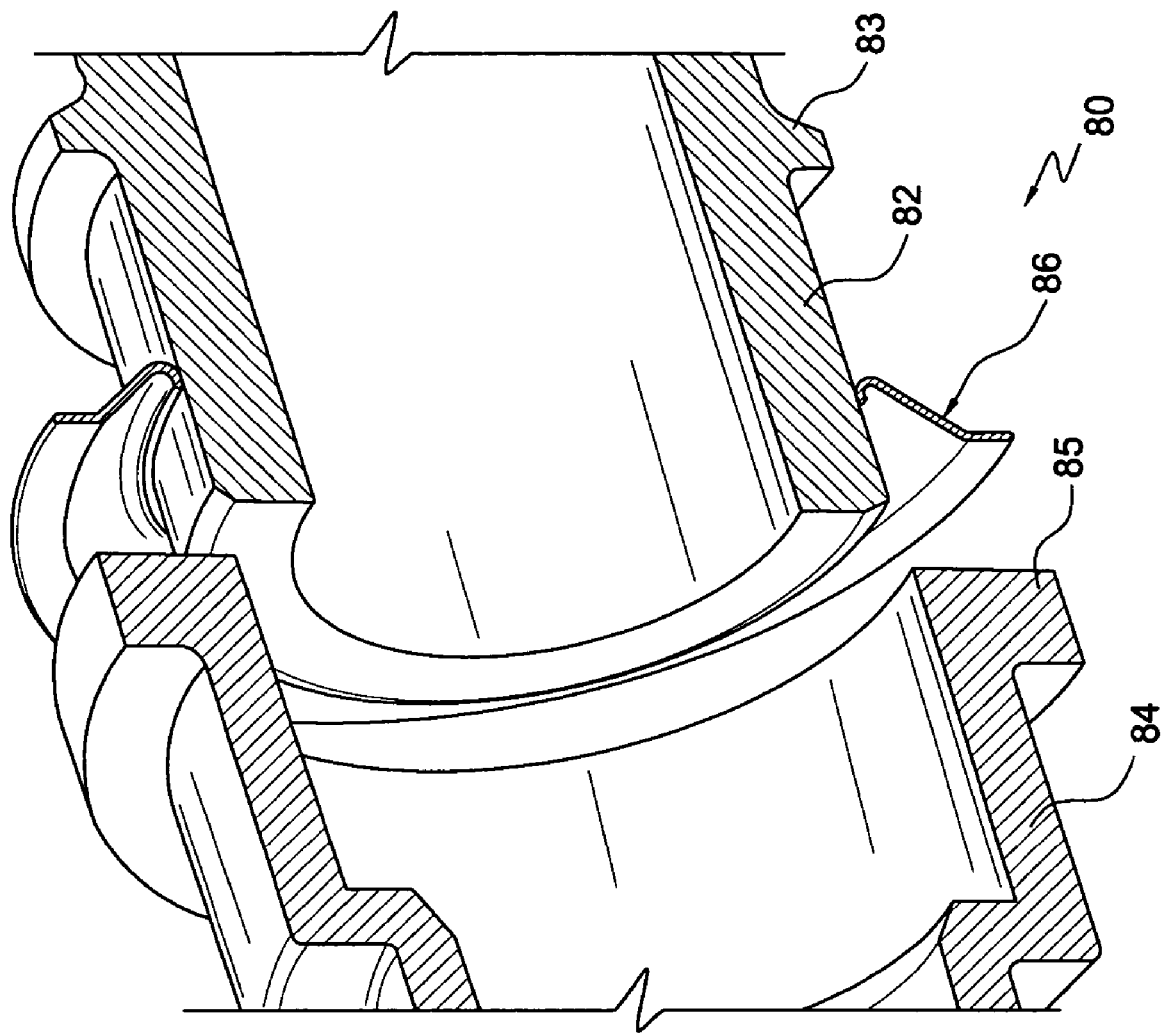
FIG. 21 shows a partial cross-sectional view from an opposite end angle of the slip joint shown in FIG. 20.

In addition, the female section 84 includes an enlarged end flange 85 that extends radially outwardly at the opening of the female section 84. In addition, the slip joint 80 is further provided with a washer seal 86. FIG. 21 shows a partial cross-sectional view of the slip joint 80 in a partially assembled view in which the washer seal 86 is received on the male section 82. As can be seen, the cross section of the washer seal 86 has a hook-like shape.

Figure 22:
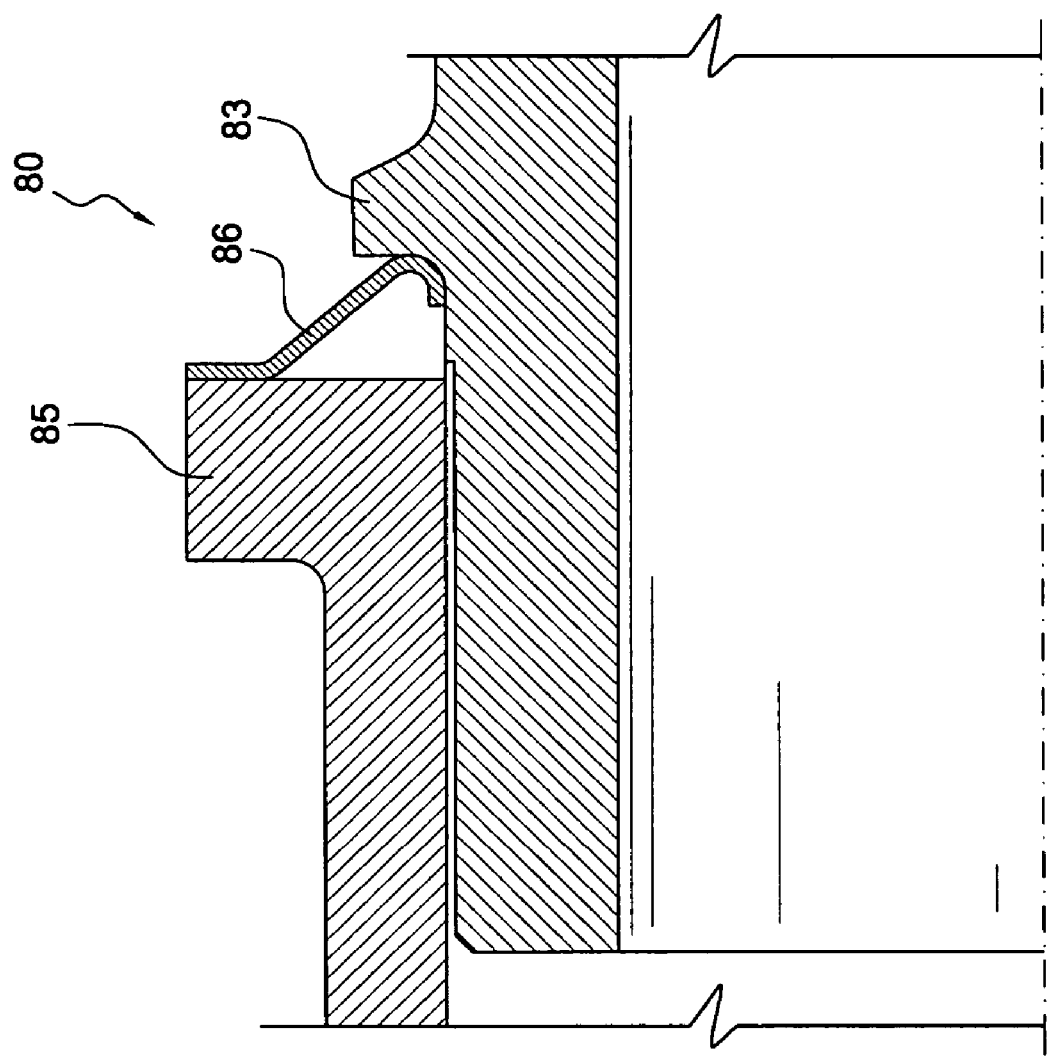
FIG. 22 shows a cross-sectional view of the assembled slip joint of FIG. 20 with the washer seal retained between the male and female sections.

FIG. 22 shows a cross-sectional view of the assembled slip joint 80. As can be seen, the washer seal 86 is received between the male section 82 and the female section 84. In particular, the washer seal 86 is compressed between the enlarged seat 83 of the male section 82 and the end flange 85 of the female section 84. Thus, in contrast to the previously described embodiments of slip joints and seal configurations, the washer seal 86 of the illustrated embodiment of the slip joint 80 is not fully enclosed between the male and female sections of the exhaust manifold. During assembly of the slip joint 80, the male section 82 and the female section 84 apply forces on the washer seal 86, thereby creating a seal between the seat 83 and the flange 85. The washer seal 86 deforms/deflects in order to allow the manifold to thermally expand and/or contract, while continuing to maintain the seal. Preferably, the washer seal 86 is also implemented to exhibit substantially constant force within the operating displacement range of the slip joint 80.

Figure 23:
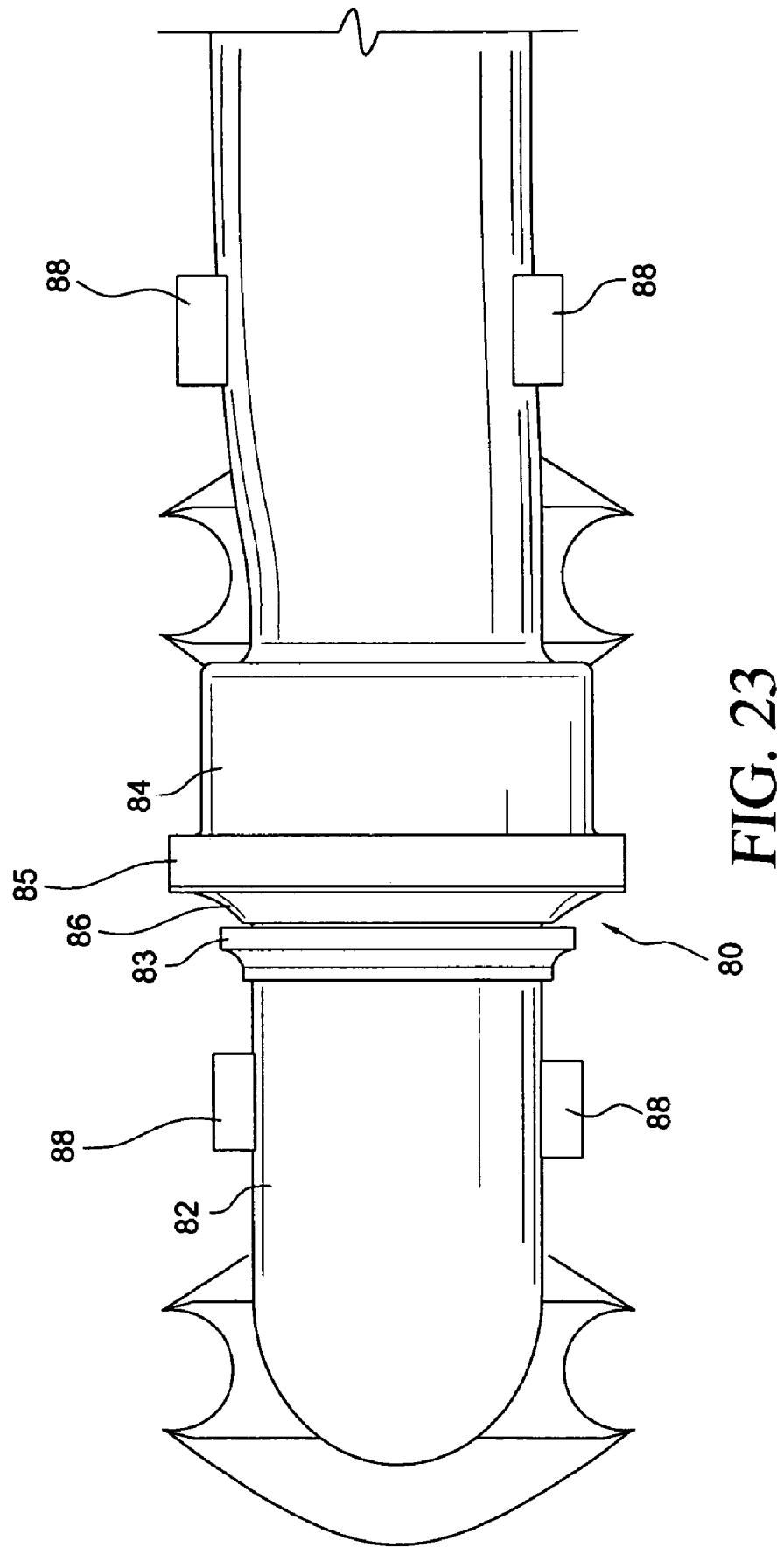
FIG. 23 shows the assembled slip joint of FIG. 20 and the tabs that can be used to preload the slip joint.
Figure 24:
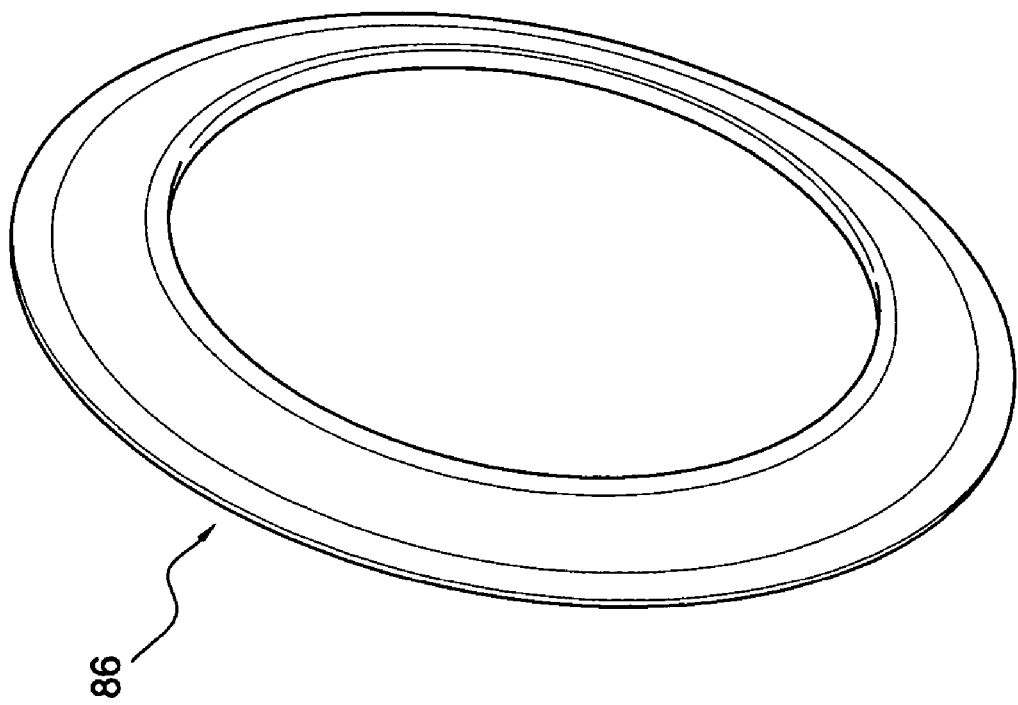
FIG. 24 shows a perspective view of the washer seal shown in FIG. 20.

FIG. 23 further illustrates the application of the washer seal 86 which, as noted above, is at least partially outside of the male section 82 and the female section 84. The retention of the washer seal 86 between the seat 83 and the flange 85 is clearly shown. Tabs 88 may be provided and used during assembly to create the proper preload on the slip joint 80 and pre-compress the washer seal 86. FIG. 24 shows a perspective view of the washer seal 86 discussed above relative to FIGS. 20 to 23. Washer seal 86 may be made of any appropriate material, for example, stainless steel, or preferably, high temperature nickel alloy such as Inconel or Monel having a thickness of 0.30-0.50 millimeters. Of course, the washer seal 86 may be sized in any appropriate manner depending on the application and the size of the exhaust system. In the illustrated embodiment in which the slip joint is utilized for a diesel engine, the washer seal 86 may be implemented with a large diameter of 95 millimeters, a small diameter of 67 millimeters, and an axial length of approximately 15 millimeters.

As described, the washer seal 86 creates a seal around both outer diameters of the male section 82, and the female section 84, so that exhaust gas is prevented from passing through the slip joint 80. A pressure force is exerted on the washer seal 86 by both the male and female sections of the slip joint 80 during assembly to create the initial seal. During engine operation, the washer seal deforms to allow the manifold pieces to thermally expand and/or contract, while maintaining a pressure force necessary to properly seal against exhaust gas leakage. Correspondingly, the washer seal 86 provides robust sealing of the slip joint. Although optional, coaxial alignment of the components is not critical, and precision slip joint clearances is not needed in the described implementation.

The above described embodiments of various seals for the different embodiments of the slip joints may be made of an appropriate material, and be manufactured in an appropriate manner. For example, the seals may be stamped, machined, forged, etc. The seals may be made of various steels and alloys. In one embodiment, the seals may be made of chrome nickel alloys. For example, the seals may be made of Inconel 625, Inconel 718 as specified in SAE-AMS5596 specification, Inconel X-750 and/or Waspoloy. The described wear sleeves may be made of more cost effective materials such as stainless steel materials like 316 Stainless, Nitronic 60, etc. If the wear sleeve is pressed in a center section bore, for example, as shown in FIG. 10, chrome nickel alloys like, Inconel 625, Inconel 718, Inconel X-750 and Waspoloy may be used to protect the sleeve from compressive yielding in a high temperature environment.

Furthermore, the components of the slip joint such as the male section, female section, the seal, and/or any wear sleeve may be coated to reduce wear. Any appropriate coating for reducing wear may be used. However, Tinalox (TiAlN) and Armoloy coatings have been found to be especially effective, Tinalox coatings tested showing little or no coating damage after 2,250 operational cycles of the slip joint. The exhaust manifold components such as the male section and/or the female section may be optionally be coated with Steam Oxide ($Fe_3O_4$) which has also been shown to be effective in reducing galling of the coated components. Electro spark deposition coatings may also be used to protect one or more components of the slip joint.

Table 1 shown in FIG. 25 sets forth various coatings and information associated therewith, which can be used in the slip joint of the various embodiments of the present invention. As can be seen, other coatings that can be used include Alcrona, Sellite 21 and 7473 Carbide. Various tests of slip joints were performed with various coatings including: a slip joint subjected to a galling cycle in which steam oxide coating was used for the male and female sections, and the seal was not provided with a coating; and slip joint subjected to galling cycles where coating was not provided on the seal, and a ceramic coating (Tinalox) was provided on the seal.

In the above regard, specific combination of materials and treatments have been found to be especially effective in providing a robust and durable sealing interface for the above described slip joints for an exhaust manifold in accordance with the present invention. In particular, the above described seals greatly reduce exhaust gas leakage in the slip joints of multi-piece exhaust manifold systems while allowing the manifolds to thermally expand during use. The sliding of the seal across the manifold along with the seal interference fit can cause macroscopic wear on the seal and/or the manifold at the contact locations. With continued use, such wear can eventually cause the seal to lose it's effective sealing capability with the manifold component, resulting in the leakage of exhaust gases through the slip joint, despite the presence of the seal.

In testing of various embodiments of the present invention, the applicants have found that a wear resistive, tribological coating which provides a barrier between the manifold component's material, while also resisting micro-welding, is desirable. In this regard, TiAlN physical vapor deposition (PVD) coating such as Tinalox noted above, applied using a sputtering process or an arc evaporation process, has been found to drastically reduce the amount of wear between the seal and manifold. It has also been found that application of TIAlN PVD by sputtering reduced the amount of macro particles and nodules that provide portions of weak areas that initiate progressive wear, as compared to the arc evaporation process.

TiAlN PVD coating that is applied by sputtering or other processes has been found to be especially advantageous in the exhaust manifold slip joint seal system of the present invention because the coating thickness is only a couple microns, which allows for relatively no change in the overall dimension of the seal. In addition, there are stresses that are created in the seal and the coating which are due to thermal expansion differences between the coating alloy and seal substrate. However, with a thin coating such as TiAlN PVD, these stresses are minimized, which results in decreasing the likelihood of the coating spalling. In addition, thicker coatings are more likely to have inner coating adhesion problems leading to failure of the coating. Finally, TIAlN has been found to have very high temperature capability along with non-stick properties at these temperatures which is advantageous in application of the present invention where exhaust gas manifold temperatures can be very high.

In addition to the above noted sputtering process or an arc evaporation process, other processes for deposition of TiAlN, or other coatings may also be used. For example, other PVD coating methods including cathodic arc, ion plating, enhanced sputtering, and plasma assisted chemical vapor deposition (PACVD), may also be utilized effectively to deposit the coating material to the seal. In addition, other alloy compositions of PVD coatings noted in Table 1 of FIG. 25 such as AlCrN, CrN, Diamond-like Carbon coatings, Diamond-like Nanocomposite coatings may also be used in other implementations of the present invention as well.

As also noted above, the components of the slip joint such as the male section, female section, and/or any wear sleeve, may also be coated to reduce wear. The exhaust manifold components such as the male section and/or the female section are preferably coated with oxide barriers/coatings such as Steam Oxide ($Fe_3O_4$) which has been shown to be effective in reducing galling of the coated components as discussed.

Furthermore, surfaces of such components of the slip joint are preferably processed to enhance the efficacy and durability of the slip joint. For instance, the interfacing surfaces of these components may be work hardened via roller burnishing. Of course, other surface processing methods may be used. Preferably, such surfaces are processed to be smooth, for example, Ra<0.9 microns and Rpm <1.5 microns.

Another feature that may be incorporated into the slip joint in accordance with the present invention is minimization of the clearance between the male and female mating components of the slip joint so that any clearance behind the seal is minimized. For example, as discussed above with respect to FIGS. 8A and 8B, minimizing the size of the diametric clearance between the male section 21 and the female section 22 to less than approximately 0.2 mm, and preferably, less than approximately 0.062 mm, has been found to improve the performance and durability of the slip joint in accordance with the present invention. This small clearance limits the displacement of the seal during thermal, and structural movements of the components of the exhaust components that incorporates the slip joint.

Furthermore, additional tests were conducted for another slip joint in accordance with the present invention which has been subjected to thermal cycles during engine testing. Both non-EGR and EGR end sections of a test exhaust gas manifold were processed by roller burnishing as described above to provide very smooth surfaces with Ra<0.9 microns and Rpm <1.5 microns. In addition, these surfaces were coated with Steam Oxide ($Fe_3O_4$). The seal that was used was coated with TIAlN PVD that was deposited via sputtering.

The test results showed that the coating on these exhaust manifold components was polished, but there was no visual sign of coating loss. Inspection of the cross section of the seal and coating used in the test showed that the TIAlN PVD coating remains intact on the seal surface, thus, exemplifying durability and appropriateness of the seal coating, manifold surface finish, and oxide barrier for use in the slip joints for exhaust manifolds in accordance with the present invention.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. An exhaust system of an internal combustion engine including a slip joint comprising:
    a female section having an opening with an inner diameter;
    a male section having an outer diameter smaller than said inner diameter of said opening of said female section, said male section being at least partially received in said female section, a portion of said male section received in said female section including a reduced diameter protrusion at least partially defined by a vertical lip received in said female section, said protrusion and said vertical lip at least partially defining a seal chamber between said male section and said female section;
    a wear sleeve disposed between said female section and said male section; and
    at least one seal contacting said wear sleeve and at least one of said female section and said male section, to seal said slip joint, said at least one seal being positioned in said seal chamber, wherein said at least one seal has a substantially J-shaped cross section with a C-shaped portion and a resilient leg portion.

2. The exhaust system of claim 1, wherein said wear sleeve is made of a stainless steel or a nickel alloy.

3. The exhaust system of claim 1, wherein a diametric clearance between said inner diameter of said female section and said outer diameter of said male section is less than approximately 0.2 mm.

4. The exhaust system of claim 3, wherein said diametric clearance between said outer diameter of said male section and said inner diameter of said female section is approximately 0.062 mm.

5. The exhaust system of claim 1, wherein said resilient leg portion includes a curved portion that abuts against said female section.

6. The exhaust system of claim 1, wherein said C-shaped portion is fluidically open to said opening of said female section so that gas pressure in said female section expands said C-shaped portion outwardly.

7. The exhaust system of claim 1, wherein said at least one seal is made of a nickel alloy.

8. The exhaust system of claim 1, wherein at least one of said female section, said male section, and said at least one seal is coated with TiAlN or $Fe_3O_4$.

9. The exhaust system of claim 1, wherein said wear sleeve is coated with TiAlN or $Fe_3O_4$.

10. An exhaust system of an internal combustion engine including a slip joint comprising:

a female section having an opening with an inner diameter;

a male section having an outer diameter smaller than said inner diameter of said opening of said female section, said male section being at least partially received in said female section, a portion of said male section received in said female section including a reduced diameter protrusion having a diameter smaller than said received portion of said male section and at least partially defined by a vertical lip received in said female section, said protrusion and said vertical lip at least partially defining a seal chamber between said male section and said female section;

a wear sleeve disposed between said female section and said male section; and at least one seal contacting said wear sleeve and at least one of said female section and said male section, to seal said slip joint, said at least one seal being positioned in said seal chamber and including a resilient leg portion including a curved portion in abutment against said female section.

* * * * *